No. 773,102. PATENTED OCT. 25, 1904.
J. W. SEE.
CASH REGISTER.
APPLICATION FILED JAN. 6, 1900.
NO MODEL. 7 SHEETS—SHEET 1.

Witnesses: James W. See
E. R. Shipley Inventor
M. S. Belden

No. 773,102. PATENTED OCT. 25, 1904.
J. W. SEE.
CASH REGISTER.
APPLICATION FILED JAN. 6, 1900.
NO MODEL. 7 SHEETS—SHEET 2.
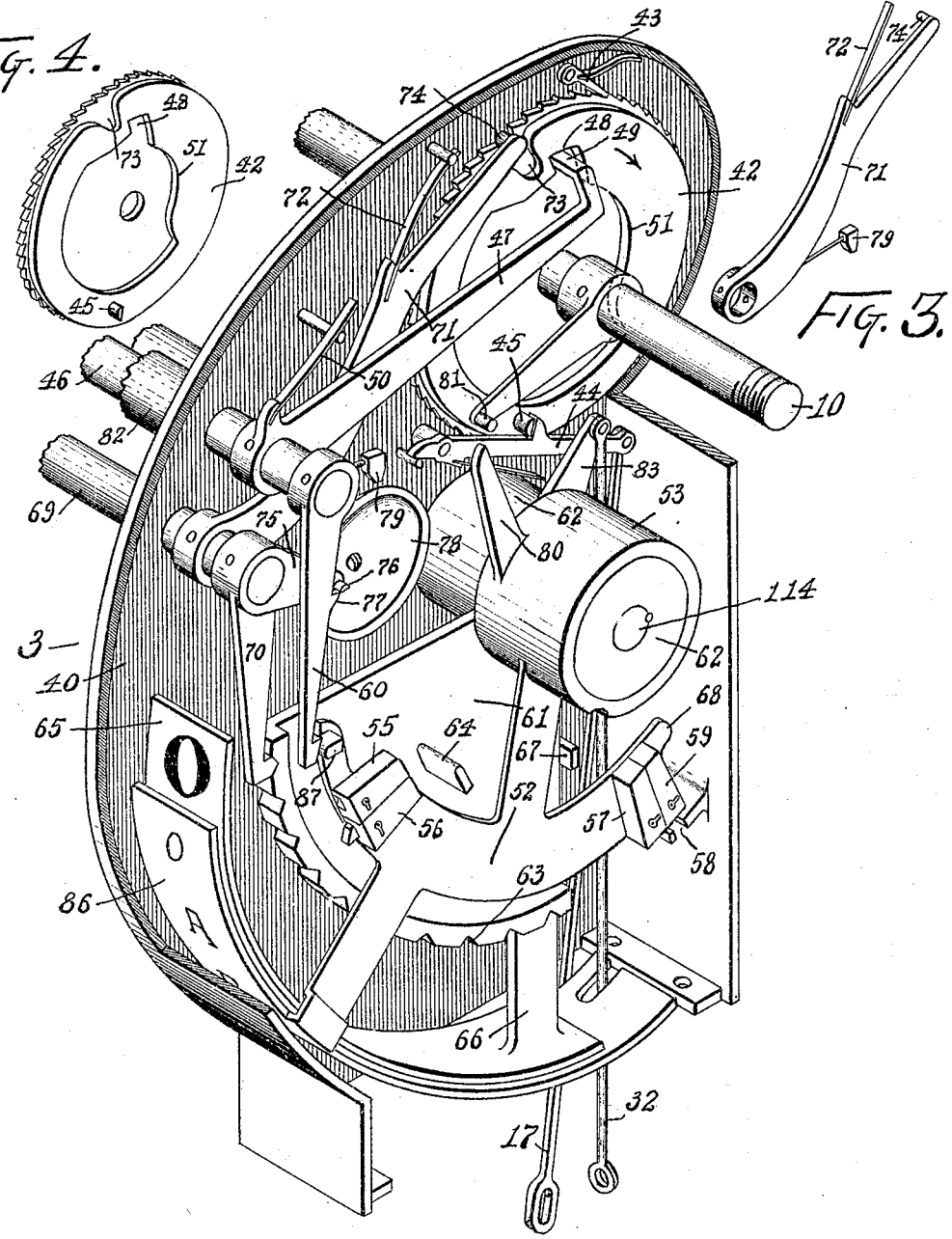
Witnesses:
E R Shipley
M S Belden
James W. See
Inventor No. 773,102. PATENTED OCT. 25, 1904.
J. W. SEE.
CASH REGISTER.
APPLICATION FILED JAN. 6, 1900.
NO MODEL. 7 SHEETS—SHEET 3.

Witnesses:
E R Shipley
M S Belden.

James W. See
Inventor

No. 773,102. PATENTED OCT. 25, 1904.
J. W. SEE.
CASH REGISTER.
APPLICATION FILED JAN. 6, 1900.
NO MODEL. 7 SHEETS—SHEET 4.

Witnesses:
E R Shipley
M S Belden

James W. See
Inventor

No. 773,102. PATENTED OCT. 25, 1904.
J. W. SEE.
CASH REGISTER.
APPLICATION FILED JAN. 6, 1900.
NO MODEL. 7 SHEETS—SHEET 5.

Witnesses:
E. R. Shipley
M. S. Belden.

James W. See
Inventor

No. 773,102. PATENTED OCT. 25, 1904.
J. W. SEE.
CASH REGISTER.
APPLICATION FILED JAN. 6, 1900.
NO MODEL. 7 SHEETS—SHEET 6.
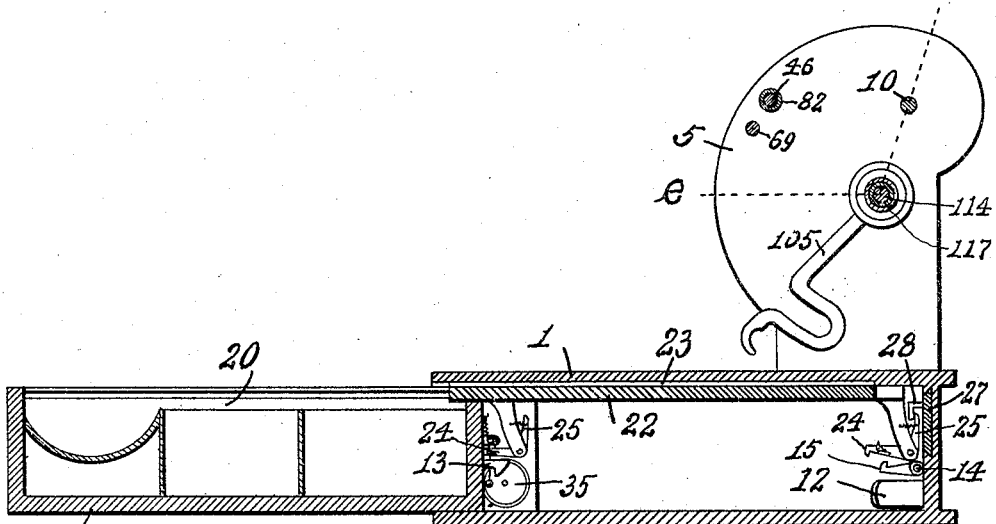
FIG. 11.
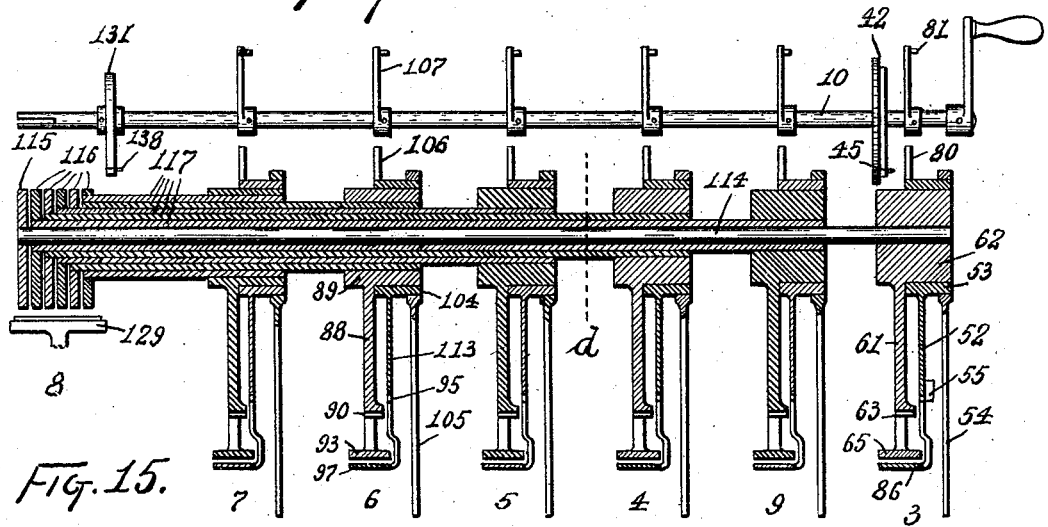
FIG. 15. FIG. 12.
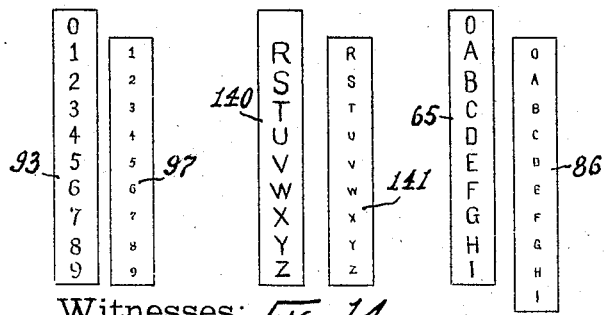
FIG. 14.
FIG. 13.
Witnesses:
E. R. Shipley
M. S. Belden
James W. See
Inventor No. 773,102. PATENTED OCT. 25, 1904.
J. W. SEE.
CASH REGISTER.
APPLICATION FILED JAN. 6, 1900.
NO MODEL. 7 SHEETS—SHEET 7.

Witnesses:
E. R. Shipley.
M. S. Belden.

James W. See
Inventor

No. 773,102. Patented October 25, 1904.

UNITED STATES PATENT OFFICE.

JAMES W. SEE, OF HAMILTON, OHIO, ASSIGNOR TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 773,102, dated October 25, 1904.

Application filed January 6, 1900. Serial No. 552. (No model.)

*To all whom it may concern:*

Be it known that I, JAMES W. SEE, a citizen of the United States, residing at Hamilton, Butler county, Ohio, (post-office address, Opera House, Hamilton, Ohio,) have invented certain new and useful Improvements in Cash-Registers, of which the following is a specification.

This invention relates to improvements in cash-registers, and has more particular relation to machines of the so-called "two-motion" type, in which a setting element is first operated and a crank handle or lever then actuated to complete the operation.

The invention consists of certain novel constructions, combinations, and arrangements of parts, all of which will be hereinafter more particularly set forth and claimed.

Figure 1:
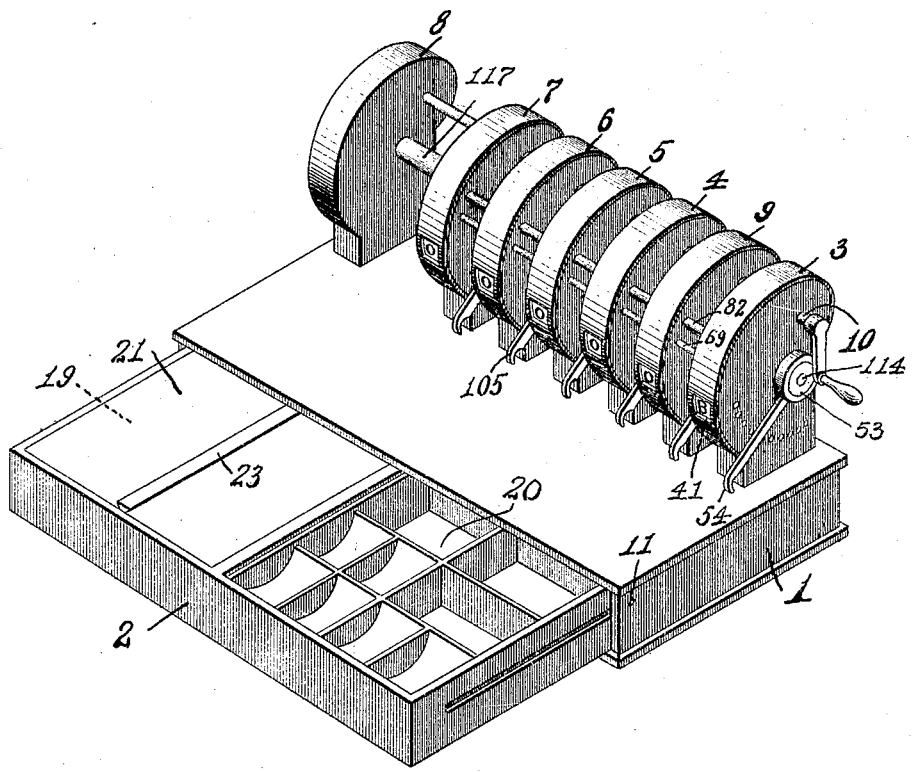
Figure 5:
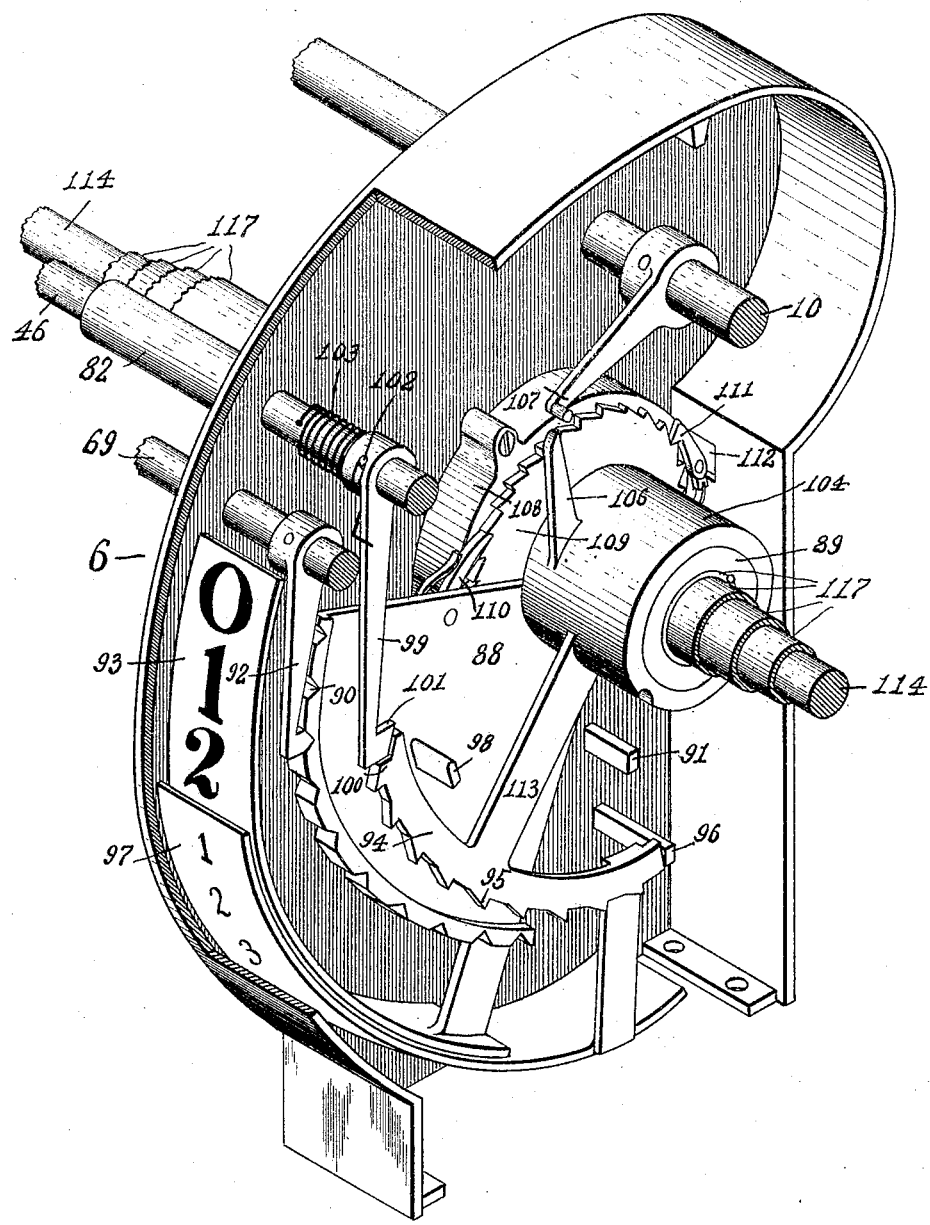
Figure 6:
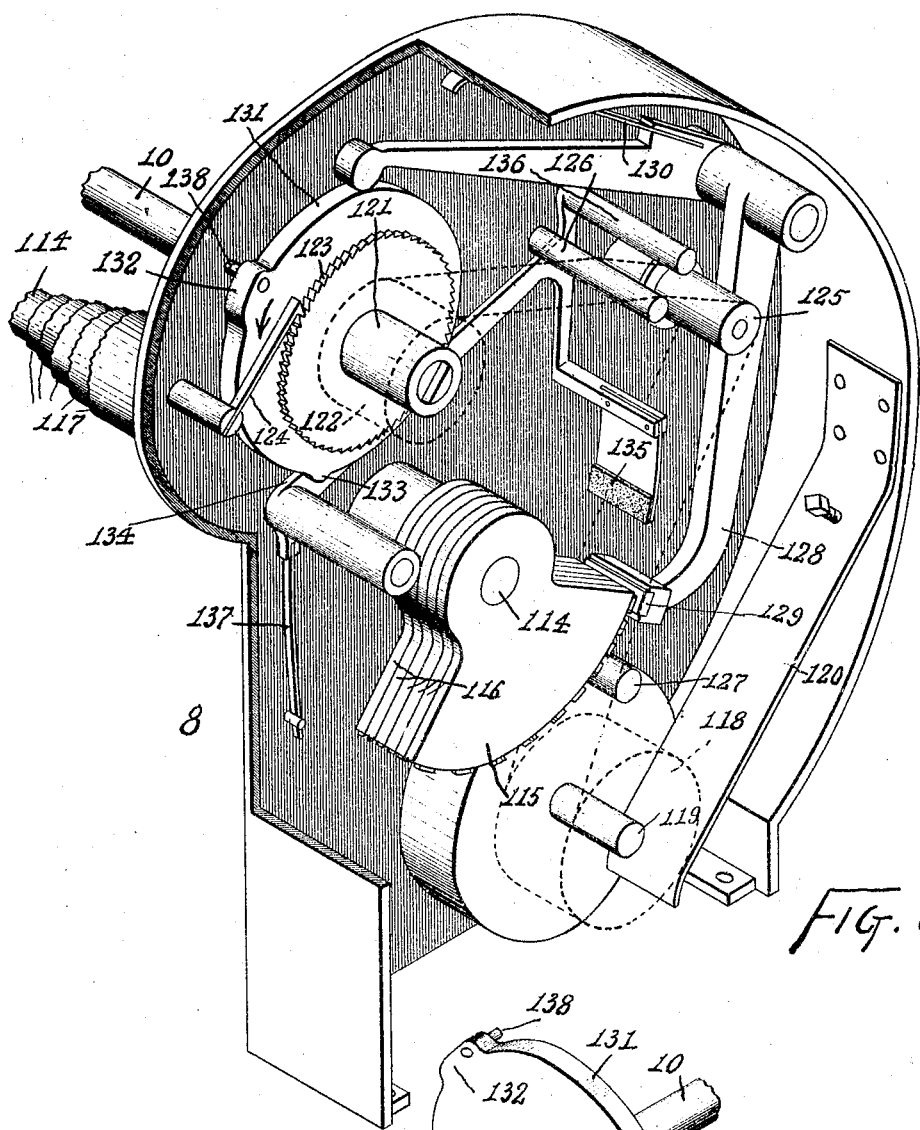
Figure 7:
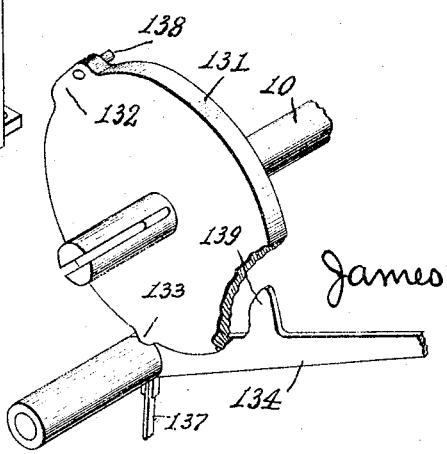
Figure 8:
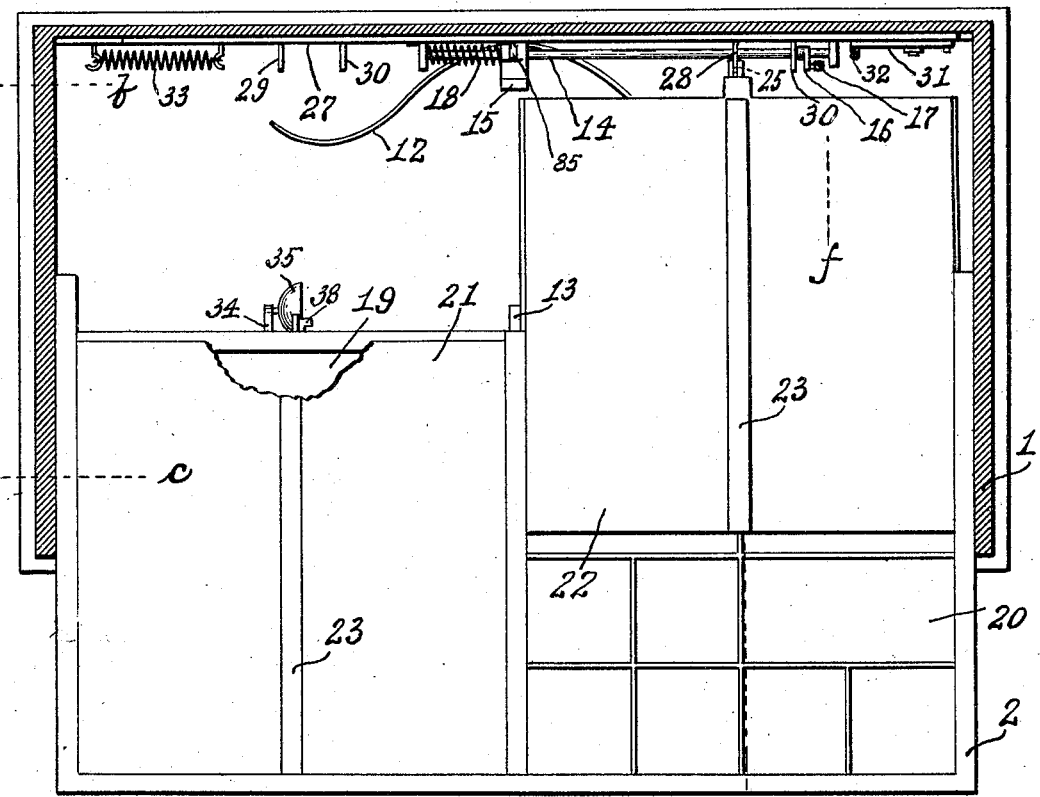
Figure 9:
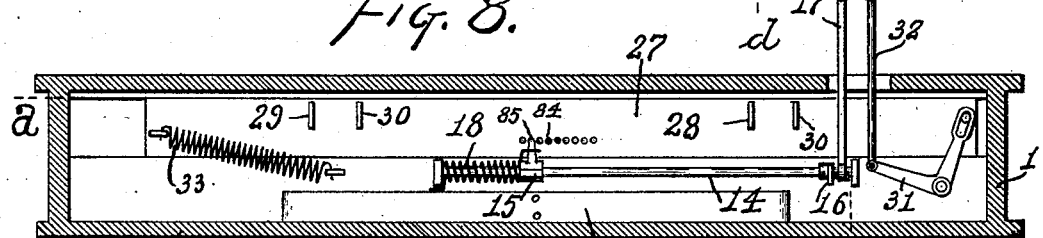
Figure 10:
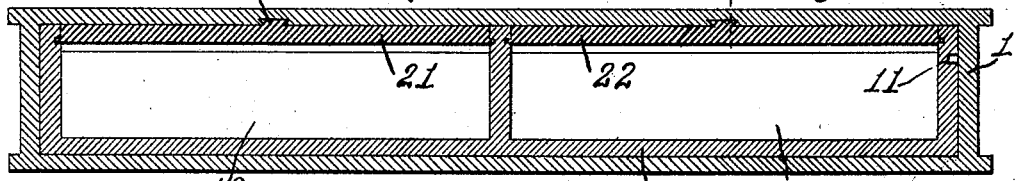
Figure 16:
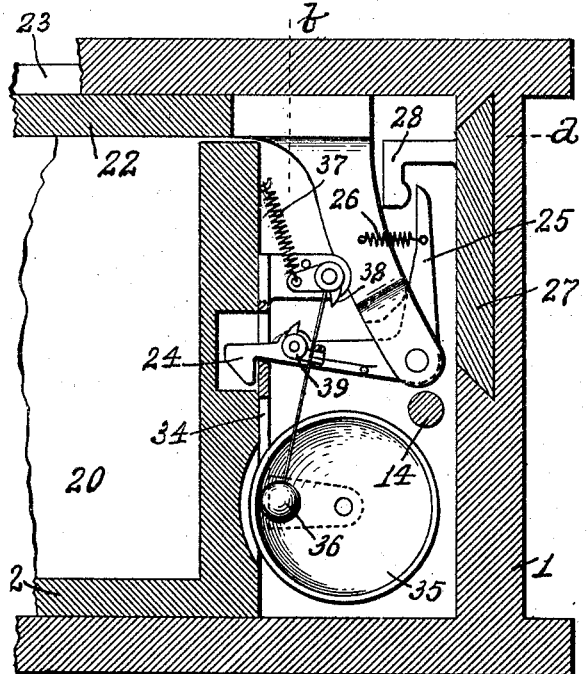
Figure 18:
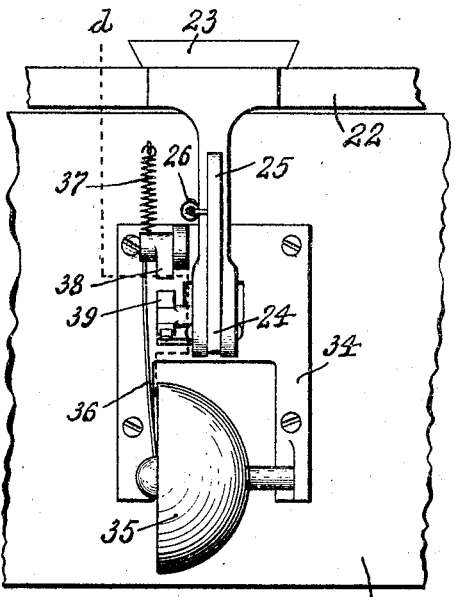
Figure 17:
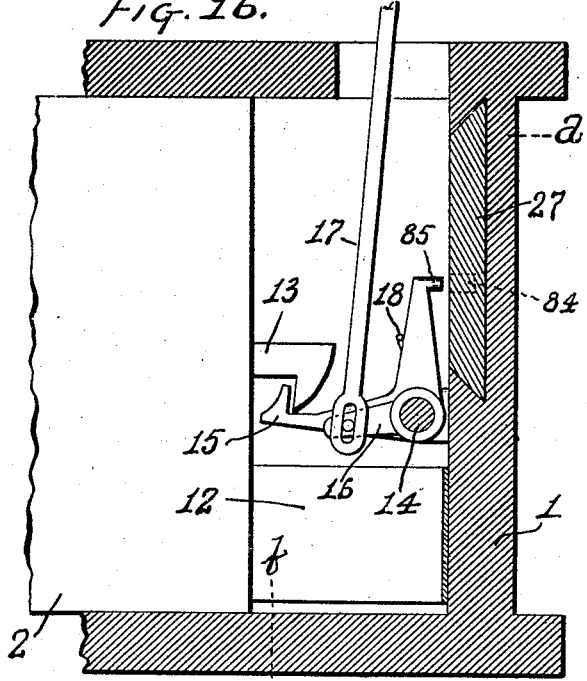

In the accompanying drawings, forming part of this specification, Figure 1 is a perspective view of a cash-register exemplifying my improvements; Fig. 2, a perspective view of the clerk's section, one side plate of the casing and part of the rim of the casing being broken away; Fig. 3, a perspective view of lever 71 dissociated from Fig. 2; Fig. 4, a perspective view of cam 42 dissociated from Fig. 2; Fig. 5, a perspective view of one of the cash-sections with a side plate and part of the casing-rim absent; Fig. 6, a perspective view of the printing-section with a side plate and part of the casing-rim absent; Fig. 7, a perspective view of the printing-cam and inking-lever dissociated from Fig. 6; Fig. 8, a plan of the base and drawer, the former appearing in horizontal section in the plane of line *a* of Figs. 9, 16, and 17; Fig. 9, a vertical longitudinal section of the base in the plane of line *b* of Figs. 8, 16, and 17; Fig. 10, a vertical longitudinal section of the base and drawer in the plane of line *c* of Fig. 8; Fig. 11, a vertical transverse section of the machine in the plane of line *d* of Figs. 8, 10, and 12; Fig. 12, a diagrammatic section of the main motion parts in the upper portion of the machine, the plane of the diagram being represented by line *e* of Fig. 11; Figs. 13, 14, and 15, diagrams illustrating exemplifying marking upon the indicators and shutters; Fig. 16, a vertical transverse section of the rear portion of the base and drawer in the plane of line *d* of Figs. 8, 10, and 18; Fig. 17, a similar section of the same parts in the plane of line *f* of Figs. 8 and 10, and Fig. 18 a rear elevation of a portion of the drawer.

In this specification the numerals of reference will be scheduled in consecutive order, general description being applied to the details in specially-related groups under suggestive headings.

*Sectional system*, (see Fig. 1.)—In the aforesaid drawings, 1 indicates the base of the machine; 2, the drawer; 3, a casing mounted on the base and containing, among other things, an indicator whose showing symbolizes the specific clerk using the apparatus, this casing and its mechanism being herein termed the "clerk's section;" 4, a similar affair mounted on the base, its indicator symbolizing cents of value and being herein termed the "cent-section;" 5, a similar section to indicate dimes and herein termed the "dime-section;" 6, a similar section to indicate dollars and herein termed the "dollar-section;" 7, a similar section to indicate eagles and herein termed the "eagle-section;" 8, a section containing the printing mechanism and herein termed the "printing-section;" 9, a section similar to the other indicating sections to indicate symbolically the quality of the transaction—as, for instance, cash paid in, cash paid out, &c.—this section being herein temed the "qualifying-section;" 10, an operating-shaft extending through all of the sections and provided with a hand-crank for turning it, and 11 a pin-and-slot device for limiting the outward movement of the drawer.

The present invention includes substantially independent sections mounted on the base, and thus permits of economical construction and mounting and adds greatly to the facility for repairs, extensions, and modification of the organization. The organization illustrated in Fig. 1 provides for indicating tens of dollars, or eagles, dollars, tens of cents, and cents, and the system permits of adding sections to indicate higher values. Again, mere substitution of sections may provide for a change in the currency—as, for instance, from the dollar and cent system to the pound, shilling, and penny system. Again, the addition of sections may provide for dealing with mixed currencies in the same machine. Again, in case of disorder or damage in a section repair may be made by replacing the given section with a perfect one. Again, the system permits of the omission of a given section, which may be supplied later. For instance, the apparatus may have its printing-section 8 or its qualifying-section 9 omitted and supplied later, if desired.

*Main lock of drawer,* (see Figs. 8, 9, 11, and 17.)—12 indicates a spring in the base at the rear of the drawer to force the drawer open when its lock is released; 13, a latch-hook projecting from the rear of the drawer; 14, a rock-shaft mounted on the inner surface of the rear wall of the base; 15, a latch-arm fast on this rock-shaft and adapted to engage drawer-hook 13 and hold the drawer shut; 16, an arm projecting from rock-shaft 14; 17, a rod attached to arm 16 and projecting up through the top of the base, and 18 a spring upon rock-shaft 14 tending to hold latch-arm 15 into engagement with drawer-hook 13.

The drawer being closed, it is held so by latch-arm 15, and the drawer can only be opened by depressing the latch-arm against the resistance of spring 18. Downward movement of rod 17 disengages latch-arm 15 from drawer-hook 13, whereupon spring 12 causes the drawer to fly open. This main lock of the drawer as thus far described will be recognized as generally following usual construction.

*Drawer-compartment locks,* (see Figs. 1, 8, 9, 10, 11, 16, and 18.)—The drawer is provided with separately-locked compartments, two compartments being illustrated in the exemplification. The idea is that several clerks will have their individual compartments in the drawer, while using the register in common.

Referring to the above-mentioned figures of the drawings, 19 indicates the left-hand compartment of the drawer, assumed as belonging to "clerk A;" 20, the right-hand compartment of the drawer, assumed as belonging to "clerk B," it being understood that the further subdivision of the two compartments mentioned is for mere convenience in separating denominations of currency; 21, a sliding lid covering compartment 19, the side edges of this lid engaging grooves in the walls of the drawer and the lid being adapted to slide rearwardly relative to the drawer, so as to uncover the compartment below it; 22, a similar lid for compartment 20, Figs. 1 and 8, showing the drawer as open, or partially so, the lid of the left-hand compartment being in covering position, while the lid of the right-hand compartment remains within the base, so as to leave that compartment uncovered; 23, fore-and-aft dovetail ribs on the lids engaging appropriate dovetail grooves in the roof of the base, so that when the drawer is in outward position and a lid in inward uncovering position the lid will be supported by the roof of the base; 24, a forwardly-reaching hook pivoted to the rear portion of each of the sliding lids, these hooks being adapted to engage latch-pieces on the rear wall of the drawer, so that while the hooks are engaged the lids are firmly locked to the drawer and are compelled to move outwardly with the drawer; 25, an arm projecting upwardly from each of hook-arms 24, 24 and 25 thus constituting a bell-crank lever; 26, a spring for each of these bell-crank levers serving to hold them in position corresponding with the engagement of hooks 24 with the drawer; 27, a comb-plate sliding longitudinally in the rear wall of the base; 28, a hooked tooth on the comb-plate normally standing to one side of arm 25 of the right-hand lid, but adapted by proper endwise movement of the comb-plate to come directly in front of that arm; 29, a similar hooked tooth pertaining to the arm 25 of the left-hand lid, teeth 28 and 29 being, however, so positioned upon the comb-plate 27 that when the comb-plate is in a certain endwise position neither tooth will be in front of a lid-arm 25 and that when the comb-plate is in a certain other endwise position tooth 29 will come in front of the left-hand lid-arm, tooth 28 still remaining idle, and in another endwise position of the comb-plate the tooth 28 will come in front of the right-hand lid-arm, while tooth 29 will be moved onward beyond the range of the left-hand lid-arm, the conditions being such that normally no tooth stands in front of any lid-arm, while by properly adjusting the comb-plate one tooth only can be brought to active position in front of one of the lid-arms; 30, a pair of similar hooked teeth so positioned on the comb-plate that when the comb-plate is properly adjusted endwise these teeth will present themselves simultaneously in front of the lid-arms; 31, a lever mounted on the back wall of the base and pivoted to the comb-plate, so that the rocking of the lever may serve in adjusting the comb-plate endwise; 32, a rod connected with this lever and projecting up through the top of the base, and 33 a spring connected with the comb-plate and tending to maintain the comb-plate in normal idle position.

Normally the drawer is closed and locked within the base by the main drawer-lock heretofore described, and at the same time the sliding lids are locked to the drawer by their hooks 24. If the main drawer-lock be released, the drawer will move to outward position; but the lids being locked to the drawer will move outward with it, leaving both compartments covered and inaccessible. If now before releasing the drawer comb-plate 27 be adjusted to the left, so that tooth 29 stands in front of vertical arm 25 pertaining to the left-hand lid, then as the drawer starts outward the tooth will arrest arm 25 and cause hook 24 to disengage from the drawer, whereupon the drawer moves forward, leaving the left-hand lid retained within the base and leaving the left-hand compartment uncovered, the lid of the right-hand compartment remaining locked to the drawer and covering that compartment. When the drawer is again closed, then the previously-opened lid becomes again locked to it. If, on the other hand, the adjustment of the comb-plate was such before releasing the drawer that tooth 28 instead of tooth 29 came in front of a lid-arm 25, then obviously the right-hand lid would be retained within the base when the drawer opened and the left-hand lid would move outward with and remain locked to the drawer. Similarly the comb-plate may be provided with any desired number of teeth to suit any desired number of sliding lids, the teeth being so positioned that a proper adjustment of the comb-plate causes but one of the comb-teeth to be in active position to cause the unlocking and retention of one of the lids. By a proper endwise adjustment of the comb-plate before the drawer is released comb-teeth 30 can be brought into action, in which case both lids are unlocked from the drawer and retained within the base. It is the intention that when clerk A operates the register he shall unlock only his own individual compartment-lid—viz., the left-hand one—and that clerk B shall unlock only the right-hand one and that the proprietor may simultaneously unlock both lids. The adjustment of the comb-plate to effect the desired results is accomplished by the mechanism of the clerks' section through rod 32, as will be later explained.

*Individual bells*, (see Figs. 8, 11, 16, and 18.)—34 indicates a plate mounted on the rear of each drawer-compartment, mortises in these plates serving as the latch-pieces for lid-locking hooks 24, before referred to; 35, a bell mounted on each of the plates, these bells to have different tones; 36, the bell-hammers pivoted to plate 34; 37, a spring for each bell-hammer to give it its active stroke; 38, a tappet on each bell-hammer near its pivot, and 39 a fly-tappet on each of hook-arms 24.

If the drawer should move outward when no comb-tooth is in front of an arm 25, then neither lid would be unlocked from the drawer and neither compartment would be opened and neither bell would sound, all the parts connected with the drawer moving outwardly with the drawer; but when upon release of the drawer one of the comb-teeth is in front of a lid-arm 25 then the drawer moves outward and leaves the appropriate lid within the base. The unlocking of this lid from the drawer involved the rising of its hook-arm 24. This rising motion brings fly-tappet 39 in front of bell-tappet 38, and as the drawer moves on outwardly, leaving the locking-hook behind, bell-tappet 38 is caught by fly-tappet 39, thus pulling back and then releasing the bell-hammer and striking the bell pertaining to the compartment whose lid was unlocked, the resulting bell tone indicating which of the compartments has been opened. When the drawer is again closed, then the locking parts and bell parts take their normal position, fly-tappet 39 yielding for the rearward passage of bell-tappet 38. When the proprietor so adjusts the comb-plate as to retain both compartment-lids when the drawer is opened, then both bells sound, the resulting tone indicating the conditions under which the drawer was opened.

*The clerk's section*, (see Figs. 1, 2, 3, and 4.)—The mechanism of the clerk's section, to be now described, serves in controlling all of the rest of the mechanism of the machine.

Referring to the drawings just mentioned, 40 indicates the casing of the clerk's section, of a form to inclose the mechanism thereof; 41, Fig. 1, a wicket in the front wall thereof through which the clerk's indicator may be viewed; 42, a cam fast on operating-shaft 10 and provided with a peripheral series of ratchet-teeth; 43, a pawl engaging these ratchet-teeth and preventing the backward turning of the operating-shaft; 44, a lever lying adjacent to cam 42 and having the upper end of rod 17 connected to its free end, it being remembered that rod 17 is the rod whose depression serves in releasing the main lock of the drawer, as heretofore explained and as seen in Fig. 17; 45, a cam-pin projecting from the face of cam 42 and adapted as the operating-shaft and cam turn in the direction of the arrow to depress lever 44 and release the main lock of the drawer and permit the drawer to fly open; 46, a rock-shaft disposed parallel with operating-shaft 10 and extending through the several sections of the machine; 47, a lever fast on this shaft and projecting therefrom to the side of cam 42; 48, a stop-notch in the face of cam 42; 49, a lug on lever 47 normally engaging within stop-notch 48 and preventing the forward turning of the operating-shaft, but adapted when lever 47 moves downward to be free of the notch, so as not to interfere with the turning of the shaft; 50, a spring tending to hold lever 47 to normal position with its lug 49 in locking engagement with notch 48, and 51 a cam-surface upon cam 42 adapted at certain stage of the rotation of the operating-shaft 10 to rock lever 47 to a lower position than is represented by its mere release from notch 48.

As thus far described it will be obvious that normally the drawer is locked in the base and held locked by its latch-hook, which can be released only by a downward movement of rod 17, the parts being held in locked position by spring 18, Fig. 9. If cam 42 be turned in the direction of its arrow, its cam-pin 45 will act on lever 44 and release the main lock of the drawer-lever 44 and the parts controlled by it returning to normal locking position the instant cam-pin 45 has done its work. The turning of operating-shaft 10 is therefore a prerequisite to the opening of the drawer; but shaft 10 is normally locked against rotation. It can never turn backward on account of pawl 43, and it cannot turn forward on account of the locking engagement of lever 47 with cam-notch 48. Suitable means are provided for depressing lever 47, and thus unlocking cam 42 and permitting the operating-shaft to make a rotation, thus releasing the main lock of the drawer and permitting the drawer to fly open, the locking parts of the drawer returning at once to normal position ready to hold the drawer when it is again closed and lever 47 tending to go to normal position to arrest and lock the cam when the operating-shaft shall have completed its full turn.

Proceeding with the description, 52 indicates a segmental plate loosely pivoted in the casing on an axis parallel with that of operating-shaft 10, this segmental plate being hereinafter termed the "clerk's sector" to distinguish it from a somewhat similar segmental plate to be termed the "clerk's segment;" 53, the hub of sector 52, this hub projecting out through the side wall of the casing, as seen in Fig. 1; 54, a finger key or lever disposed exterior to the casing and fast on hub 53 of sector 52, whereby the finger-key may serve in oscillating the sector upon its axis, this finger-key being hereinafter termed the "clerk's key;" 55, a small key-lock secured to sector 52, its bolt working radially and having the form of a beveled tooth, this lock being the first of a segmental series of similar locks and by reason of its appropriation being herein termed "clerk A's lock," this lock appearing in Fig. 2 as having its bolt retracted to inactive position; 56, a similar lock disposed upon the sector next to clerk A's lock and shown with its bolt protruded to active position, this lock being herein termed "clerk B's lock;" 57, a similar lock secured upon the sector at some circumferential distance from clerk B's lock 56, the space between locks 56 and 57 being a blank space upon the sector adapted for the reception of several other locks, the illustration providing room for six additional locks, locks 55 and 57 representing the initial and terminal locks of a contemplated series of nine locks, lock 57 being herein termed the "proprietor's lock;" 58, a lock-notch at the wall of the casing; 59, a lock secured to the sector and adapted to have its bolt thrown into lock-notch 58, under which conditions the sector will be positively locked to the casing and prevented from being moved under the influence of clerk's finger-key 54, this lock being herein termed the "lock-up lock," as it serves to lock the entire machine against any operation whatever, and 60 an arm fast on rock-shaft 46 and having its free end beveled and provided with a hook, which hook lies in the vertical plane of the bolts of the locks upon the sector and in position to be engaged by those bolts as the sector is rocked upon its axis.

Lever 47 normally locks the operating-shaft against rotation, and it must be moved down before the shaft can be turned, as before explained. Assuming all the bolts in the locks on the sector to be back to inactive position, then no movement of the sector will have any effect in releasing the operating-shaft; but in Fig. 2 the bolt of clerk B's lock 56 is out. Hence if the sector be rocked upwardly the bolt of this lock 56 will engage the end of lever 60 and cause lever 47 to unlock the operating-shaft. At the same time the hook on lever 60 will catch under the bolt of the lock and sustain the sector. Similarly any of the locks 55, 56, or 57 can when their bolts are outward serve in unlocking the operating-shaft. Lock-up lock 59 has nothing to do with this operation, as the sector never moves far enough to bring its bolt to lever 60. Thus when no lock-bolts are in outer active position the operating-shaft cannot be unlocked, and when the lock-bolts are in outer active position any one of them may be caused to unlock the operating-shaft by angularly adjusting the sector to position to bring the given lock-bolt into action upon lever 60, which lever catches the lock-bolt and prevents the returning motion of the sector. Each clerk may have a key to his own sector-lock and by throwing his bolt back to inactive position may prevent the machine being operated at the angular setting of the sector appropriate to his individual use. In the illustration Fig. 2 the operating-shaft can be unlocked only at the angular setting of the segment appropriated to clerk B's use, the bolt of clerk A's lock 55 being retracted and the bolt of the proprietor's lock 57 being assumed as retracted, which will be its normal condition.

Proceeding with the description, 61 indicates a segment loosely pivoted in the casing, with its axes coinciding with that of sector 52, this part being herein termed the "clerk's segment;" 62, the hub of this segment, the clerk's sector turning loosely upon it; 63, a circumferential series of notches in the rim of segment 61, these notches being equally spaced and being ten in number in the illustration; 64, a lug projecting from segment 61 in position to be engaged by the arm of sector 52, the normal distance between the lug and arm corresponding with the angular distance between two of the notches 63 of the segment, the arrangement being obviously such that sector 52 may be moved up one degree of distance, whereupon its arm will engage lug 64 and cause the sector and segment to continue their motion in company; 65, a segmental indicator forming a part of segment 61 and bearing on its face a series of prominent markings visible through the wicket in the casing, there being one marking upon the indicator for each of the notches 63 of the segment, the marking being indicated at 65 in Fig. 13 as comprising a zero and a series of letters from "A" to "I," inclusive, the zero indicating normal or zero position of the parts, while the letters symbolize the eight possible clerks and the proprietor, symbol "A" in the present case pertaining to clerk A, symbol "B" to clerk B, and symbol "I" to the proprietor; 66, the arm of segment 61, by means of which indicator-segment 65 is rigidly united to or made integral with segment 61; 67, a rigid stop in the casing, against which segment 61 rests in normal position with the zero of its indicator appearing at the wicket; 68, a stop upon sector 52, adapted to engage the fixed part of the casing when the sector is in its extreme downward position; 69, a rock-shaft through the several sections; 70, an arm fast on this rock-shaft and having at its free end a tooth adapted for engagement with the notches 63 of the segment; 71, an arm fast on rock-shaft 69 and projecting to cam 42; 72, a spring urging arm 71 toward operating-shaft 10 and urging the tooth of arm 70 out of engagement with the notches of segment 61; 73, a cam-notch in the periphery of cam 42; 74, a pin projecting from lever 71 and adapted to ride upon the circular periphery of cam 42 and to drop within notch 73 therein; 75, an arm fast on rock-shaft 69; 76, a pin projecting from arm 75; 77, a trigger projecting from lever 60 in position to engage under pin 76 and hold lever 70 in such position that its tooth will lock into one of the notches of segment 61; 78, a bell mounted in the casing; 79, a bell-hammer carried by lever 71 and adapted to strike the bell when pin 74 drops into notch 73; 80, an arm projecting from hub 53 of sector 52; 81, an arm fast on operating-shaft 10 and adapted during the turning of the shaft to engage arm 80 and turn the sector down to normal position, as represented by the engagement of its stop 68; 82, sleeves loosely surrounding rock-shaft 46 where that shaft crosses between the several sections of the machine, the object of these loose sleeves being to prevent the rock-shaft being irregularly operated; 83, an arm projecting from hub 62 of segment 61, this arm having connected with it the upper end of rod 32, which, it will be remembered, is the rod whose vertical movement determines the position of adjustment of the sliding comb-plate controlling the unlocking of the drawer-lids; 84, Figs. 9 and 17, a series of nine holes in the sliding comb-plate; 85, Figs. 8, 9, and 17, a locking-arm carried by locking-hook 15 of the main lock of the drawer, the end of this locking-arm being provided with a pin adapted to enter such one of holes 84 in the comb-plate as may be opposite the pin at the time the drawer is opened, this pin being normally free of the comb-plate; 86, a segmental indicator carried by clerk's sector 52 and disposed as a shutter in front of clerk's indicator 65, indicator 86 being herein termed the "clerk's shutter," the shutter bearing in non-conspicuous characters a repetition of the symbols appearing upon the clerk's indicator 65, and 87 a lug carried by sector 52 in advance of clerk A's lock 55 in position to attack the end of lever 60 at the first movement of the clerk's sector and to rock lever 60 outwardly a sufficient distance to untrigger pin 76, but not a sufficient distance to release pin 49 from notch 48 in cam 42.

Referring to Fig. 2, clerk's segment 61 is in normal or zero position against its stop 67, the zero of the indicator showing at the wicket of the casing. Clerk's sector 52 is in its normal starting position as determined by its stop 68. When the sector and the segment are in these positions, there is one degree of lost motion between the sector-arm and lug 64, representing one notch behindhand relative to indicator 65 and does not obscure the indicator-zero at the wicket, the shutter being quite out of sight. The markings on the shutter are the same as on the indicator except as to conspicuousness of marking, as may be judged from Fig. 13, in which 65 is the clerk's indicator and 86 the clerk's shutter. The operating-shaft 10 is locked against rotation by lever 47, as has been heretofore explained. Segment 61 is locked in its zero position by the tooth on arm 70 engaging the zero-notch of the segment, and arm 70 is locked in this locking position by trigger 77. Under these conditions the drawer will be locked, the lids will be locked to the drawer, the comb-plate will be in zero position with no tooth in front of a lid-arm, the operating-shaft will be locked against rotation, the clerk's indicator will show "0," the clerk's indicator will be locked at zero by arm 70, and the clerk's shutter will be out of sight.

Assume the sector-locks to be as in Fig. 2—that is, the bolt of clerk A's lock 55 back out of action, the bolt of clerk B's lock 56 protruded, the bolt of the proprietors's lock 57 back out of action, and the bolt of lock-up lock 59 retracted, so that the machine may be used. Clerk B desires to open the drawer and get access to his compartment therein. He raises clerk's finger-key 54, Fig. 1. The first effect of this movement is to raise the shutter 86 and obscure the prominent indicating-zero and to substitute the inconspicuous shutter-zero for it at the wicket. When this has taken place, then the arm of sector 52 engages segment-lug 64, and the sector and segment are ready to swing up in company. Arm 70 normally locked the segment; but the initial movement of the sector caused lug 87 to act on arm 60 and untrigger pin 76, thus permitting spring 72 to act and release arm 70 from the segment, pin 74 dropping into notch 73 of cam 42. This has all taken place while the sector was overcoming its one degree of lost motion. The continued rising of the clerk's finger-key brings the bolt of clerk B's lock 56 to the tooth of lever 60, causing that lever to rock farther than was effected by lug 87 and resulting in the unlocking of pin 49 from notch 48 in cam 42, thus releasing the operating-shaft. The position of clerk B's lock 56 corresponds with the third notch in the segment, the first notch being the zero-notch, the second clerk A's notch, and the third one clerk B's notch. Arm 60 will hook under clerk B's lock-bolt and sustain the sector in the position in which it has been set, with the shutter showing "B" and obscuring the "B" on the indicator behind it, the segment and indicator having been set to position B in the act of setting the sector to that position. The operating-shaft may now be turned, and when cam-pin 45 engages lever 44 it will release the main lock of the drawer and the drawer will fly open. As cam 42 starts from its initial position it finds pin 74 down in notch 73, corresponding with the unlocked position of arm 70, essential to the adjustment of the segment; but the first effect of the turning of the cam is to raise arm 71 by the action of the cam-shaped shore of notch 73 and to lock the tooth of arm 70 into B's notch of the segment, the riding of pin 74 on the circular periphery of cam 42 maintaining this locking of the segment while the cam is turning. During this operation only the inconspicuous "B" shows at the wicket. As operating-shaft 10 nears the end of its turn its cam 51 engages pin 49 and rocks arm 60 out of engagement with the bolt of B's lock 56, thus freeing the sector and permitting it to fall to normal position, as determined by stop 68, this falling of the sector withdrawing the shutter and exposing the symbol "B" of the indicator for the inspection of the customer or others concerned. If the sector does not drop to normal position, it is forced to that position by the action of arm 81 on arm 80. Upon the completion of the turn of the operating-shaft the pin 49 engages in notch 48 and prevents the further turning of the shaft, this action also bringing trigger 77 under pin 76 and locking the segment in position with its symbol "B" showing at the wicket. Under these conditions the drawer has been opened, symbol "B" shows at the wicket, the indicator is locked in such position, the operating-shaft is locked against further turning, the clerk's finger-key is in normal position, and the mechanism of the clerk's section remains locked until unlocked by a second use of the finger-key. Bell 78 sounded the instant trigger 77 was released, there thus being an alarm as the first result of manipulating the machine and quite independent of the alarm produced by the opening of the drawer taking place later.

So far as the action of the clerk's section has been described the drawer would have opened with both compartments covered; but the adjustment of the segment to the "B" notch, as has been described, results in the depression of rod 32 and the consequent endwise adjustment of the comb-plate to such position that comb-tooth 28, Figs. 8, 9, and 16, will come in front of the lid-arm 25 of "B" compartment, thus obviously causing the lid of this compartment to be retained within the base when the drawer opened, the lid of clerk A's compartment remaining locked to the drawer. If the bolt of clerk A's lock 55 were thrown out to active position, then the machine could be operated thereby and the indicator show the symbol "A" and the drawer caused to open, with A's compartment only uncovered. Thus a turn of the operating-shaft is essential to the unlocking of the drawer. The shaft can only be turned after a setting of the indicator. The indicator can only be set in correspondence with some lock-bolt which is thrown to useful position. The indicator will show which lock-bolt has been employed. The indicator is locked between operations of the machine, and the drawer is uncovered only at the compartment corresponding with the indication. If the proprietor sets out the bolt of his lock 57, then by adjusting the indicator to the symbol "I" he can operate the machine and open the drawer with both compartments uncovered. The blank space seen between locks 56 and 57 provides for additional clerks' locks if additional drawer-compartments are provided.

As to whether or not the drawer of a cash-register should require to be closed prior to each operation of the register is a controversial question, and inventions have been made founded on advantages thought to lie on both sides of the question; but a very peculiar condition results from the system now under consideration. A given clerk, if busy, can make any number of uses of the register without the necessity for closing the drawer, thus expediting business; but if there is a change of clerks or an alternation of clerks using the register then the drawer requires to be closed to permit the proper use of the register. (Turn to Fig. 17.) Normally the drawer is locked, and pin 85 is free of the comb-plate and held so by hook 15, being limited in its upward motion by latch 13. If clerk B releases the drawer, he will have set the comb-plate to its B position, and when the drawer shall have moved outward hook 15 will rise abnormally and pin 85 will enter the "B" hole in the comb-plate, the slotted connection at the lower end of rod 17 permitting this excessive rise of hook 15. When clerk B next uses the machine, the first effect of his raising the clerk's finger-key is to untrigger pin 76 and release arm 70 from the segment. Under ordinary conditions the segment would fall to its zero position by gravity and by the action of spring 33 on the comb-plate; but as clerk B left the drawer open the pin 85 locks the comb-plate in the B position, thus also locking the segment in the B position. He can thus continue to use the register set at "B;" but clerk A, finding that clerk B had left the drawer open, could not operate the register on his own setting, as it would be first necessary for him to close the drawer to disengage pin 85 from the "B" hole in the comb-plate, so as to permit of a setting of the indicator at the symbol "A." The machine may thus be properly operated as often as desired by a single clerk without closing the drawer; but proper operation by a change of clerks requires the closing of the drawer at each change.

*The dollar-section,* (see Figs. 1 and 5.)—The casing and some of the details of this section are similar to those of the clerk's section, the dollar-section having a notched segment, a sector, a finger-key, an indicator on the segment, and a shutter on the sector.

Referring to Fig. 5, 88 indicates the dollar-segment; 89, its hub; 90, the notches in the segment, (ten in number;) 91, stop-lug which arrests the downward movement of the segment when it reaches its zero position; 92, an arm fast on rock-shaft 69 and having a tooth to engage the notches 90, the illustration showing the tooth as being locked into the third or two-dollar notch; 93, the dollar-indicator, prominently marked up with indications from "0" to "9," inclusive, as seen in Fig. 15, the setting of the parts in Fig. 5 being such as to bring the indicating-numeral "2" to the wicket; 94, the dollar-sector; 95, a series of nine teeth thereon; 96, a stop-lug to arrest the downward movement of the sector at its zero position; 97, the dollar-shutter, moving with the sector and bearing inconspicuous marking corresponding with the indicator, except that the zero is omitted, as seen in Fig. 15; 98, the segment-lug to be engaged by the arm of the sector, this lug lying against the sector-arm when both the segment and the sector are in zero position; 99, an arm loose on rock-shaft 46; 100, a notch at the upper end of sector 94, catching under the end of arm 99 when the sector is in zero position; 101, a tooth on arm 99, adapted to engage under teeth 95 and sustain the sector; 102, a pin in rock-shaft 46, engaging a slot in the hub of arm 99, so that the movement of the rock-shaft in one direction will rock arm 99 outwardly, the arm being at liberty to rock outwardly independent of the movement of the rock-shaft; 103, a spring engaging rock-shaft 46 and arm 99 and tending to press the arm inwardly; 104, the hub of the sector, loose on hub 89 of the segment; 105, Figs. 1 and 11, the dollar finger-key, fast on hub 104 of the dollar-sector exterior to the casing of the section; 106, an arm projecting from the hub of the sector; 107, an arm fast on operating-shaft 10 to act on arm 106 and turn the sector to its zero position; 108, the counter; 109, the ratchet-wheel of the counter, each tooth thereof representing one degree of count and representing one notch of advance of the segment; 110, a pawl on the segment and engaging the ratchet-wheel of the counter, so that the counter is advanced in correspondence with the upward movement of the segment; 111, a stop-pawl to prevent retreating movement of the ratchet-wheel of the counter; 112, wicket through which the readings of the counter may be taken, and 113 the arm of the sector uniting it to its hub.

Normally the segment 88 is down against its stop 91, with its indicator showing "0" and the tooth of arm 92 matching the first notch of the segment. The sector 94 is at zero position against its stop 96, its shutter being out of sight by reason of the fact that it is too short to bear a zero, the zero of the indicator thus being exposed. Lug 98 is against sector-arm 113, there being no lost motion here, the mechanism in this respect differing from that of the clerk's section. The sector is locked down to its zero position by the engagement of the end of arm 99 with notch 100, and the segment is locked in its zero position by arm 92. The mechanism of this section cannot be operated by its finger-key until the lockings by arms 92 and 99 are released, which release must be effected at the clerk's section. Recurring to the clerk's section, the first effect of the rising of the clerk's finger-piece was to untrigger rock-shaft 69, whereupon arm 92 in the dollar-section becomes released from the segment. When the bolt of the clerk's lock went into action, it rocked rock-shaft 46, the effect being to swing arm 99 of the dollar-section outwardly sufficiently to unlock at notch 100. Manipulation at the clerk's section has thus unlocked the mechanism of the dollar-section. Now, assuming a two-dollar sale, the clerk will raise the dollar finger-key, thus raising the sector and the segment and the indicator and the shutter, the shutter obscuring the indicator at the wicket. He will stop when the figure "2" of the shutter appears at the wicket. Tooth 101 will then be caught under the second tooth of the sector and sustain the sector, arm 99 moving for this pawl-like action independent of any rocking motion of shaft 46, the segment moved up the same distance as the sector, thus bringing its third or two-dollar notch opposite the tooth of arm 92 and bringing its indicating-numeral "2" opposite the wicket, but obscured by the shutter. At the same time pawl 110 advanced the ratchet-wheel of the counter two teeth. The dollar-section has now been properly set for two dollars, which amount has been charged into the counter. The operating-shaft, released by the action of the clerk's section, is now given its turn. One of its first actions is, as explained in connection with the clerk's section, to rock shaft 69, the result being that the tooth of arm 92 locks into the two-dollar notch of the dollar-segment. Later in the turn of the operating-shaft the rock-shaft 46 is turned, as explained in connection with the clerk's section, this action releasing hook 101 from the dollar-sector and permitting that sector to fall to zero position or to be moved thereto by the action of arms 106 and 107. The return of the sector to zero position retires the dollar-shutter out of sight and leaves the numeral "2" of the indicator exposed at the wicket. The parts of the dollar-section remain locked in position until unlocked by later action at the clerk's section. When the register is to be used again, then the first effect of movement of the clerk's finger-key is to permit shaft 69 to rock, thus releasing the dollar-segment from the tooth of arm 92 which held it in the two-dollar position, the segment then falling to zero ready for a new setting of the dollar mechanism. Thus the mechanism of the dollar-section cannot be operated at all until the mechanism of the clerk's section has been properly manipulated and set in correspondence with some clerk's lock having its bolt set out to active position. The mechanism of the dollar-section remains locked between manipulations of the machine, and the setting of the dollar mechanism must necessarily proceed from zero as a starting-point.

*Other money-sections*, (see Fig. 1.)—The cent-section 4, dime-section 5, and tens-of-dollars or eagle section 7 do not differ from the dollar-section just described, except, possibly, that the dollar-section may have decimal-points after its indicating-numerals or the dime-section may have decimal-points before its indicating-numerals, the relative arrangement of the parts pertaining to the different denominations being as usual in this class of machines.

*The printing-section*, (see Figs. 1, 6, 7, and 12.)—The printing-section 8 is incased similar to the other sections.

Referring to Figs. 6 and 12, 114 indicates a rock-shaft extending axially through the segments and sectors of all of the sections, the segment 61 of the clerk's section being fast thereon, so that this shaft rocks with the clerk's segment; 115, a printing-segment fast on the end of this shaft within the casing of the printing-section, this printing-segment bearing type in duplication of the symbols on the clerk's indicator; 116, five additional printing-segments alongside the one just referred to, these five printing-segments being appropriated to the eagle-section, the dollar-section, the dime-section, the cent-section, and the qualifying-section, respectively, and each bearing type in duplication of the indicators of their appropriate sections; 117, a concentric series of quill-shafts surrounding shaft 114, the outermost one having fastened to it the segment of the eagle-section and also the rearmost or eagle printing-segment, and so on throughout the series, as quite usual in cash-registers with printing attachments; 118, the supply roll or spool of record-paper; 119, a stud on which this roll or spool is mounted, this stud projecting from a seat or boss on the wall of the casing of the printing-section; 120, a tension-spring for the supply-roll of paper; 121, a hub on which is wound the record-paper after printing, this hub being loosely mounted on the end of operating-shaft 10, projecting within the casing of the printing-section and being held thereto by spring friction, preferably produced by slitting the end of the shaft, so that it will have an expansive spring fit within the hub; 122, the roll of record-paper wound on this hub; 123, a ratchet-flange on hub 121; 124, a pawl engaging this ratchet and permitting it to turn forward with operating-shaft 10, but preventing backward motion of the hub and roll of paper; 125, a guide pin or roll over which the record-paper runs on its way from supply-roll 118 past the printing-segments to the storage-roll 122; 126, a second guide-pin or roll near the first one, both these pins being fast in the casing; 127, a third guide-pin over which the paper passes on its way from the supply-roll 118 to the printing-point; 128, a rocking printing-lever in bell-crank form; 129, a printing-pad on the end of this lever; 130, a spring connected with the printing-lever and urging the printing-pad away from the printing-segments; 131, printing-cam on operating-shaft 10; 132, a lobe on this cam adapted to rock the printing-lever and produce the printing impression; 133, a second lobe on the cam adapted to rock the printing-lever a trifle in the printing direction; 134, an inking-lever; 135, an inking-pad carried by this lever and adapted when the lever rocks down to take position between the printing-segments and the printing-pad; 136, a feed-pin carried by the inking-lever and lying over the paper between guide-pins 125 and 126 and adapted to pull the paper down between those guide-pins as the inking-lever rocks downwardly; 137, a spring connected with the inking-lever and tending to hold it to idle position; 138, a pin projecting from cam 131 and 139, a lug on printing-lever 134, adapted to be engaged by pin 138, whereby as the operating-shaft turns the inking-lever will be depressed to inking position.

The printing-point on the printing-segments is opposite printing-pad 129. The printing-segments will be automatically set in correspondence with the setting of the segments and indicators of the various sections of the machine, as quite usual in cash-registers with printing attachments, and when the printing-lever is rocked there will be impressed upon the paper a line of reading corresponding with the setting of the several indicators. This printing takes place during the turn of the operating-shaft, the printing-segments returning to their normal position when their respective segments in the several sections go to their normal positions. After the operating-shaft begins its turn and before the printing takes place pin 138 depresses ink-pad 135, bringing it between the type and the printing-pad. Lobe 133 then gives a mild stroke to the printing-pad, thus pressing the ink-pad lightly to the type, after which the printing-pad retreats and the inking-pad rises out of the way. Then lobe 132 gives the printing-pad its printing stroke, thus completing the printing operation. When the inking-lever descends, it carries feed-pin 136 downwardly, thus pulling a loop into the paper between pins 125 and 126. This looping of the paper requires slack, and as pawl 124 prevents the slack being taken from storage-roll 122 it follows that it must be drawn from supply-roll 118. The continued turning of the operating-shaft forward causes the slack thus produced to be taken up by storage-roll 122, whereby there is produced a forward feed of the paper at each actuation of the machine, the degree of this feed being properly proportioned to suit the spacing required for the printing. The production of the loop and the slack to permit it is almost instantaneous, and the comparatively continuous motion of the operating-shaft during an impulse of the machine is adequate to take up the slack in the paper. When the slack has thus been taken up, then the operating-shaft turns without turning the storage-roll of paper, the storage-roll being turned by friction only, this plan also providing adequately for increase in the size of the storage-roll as it accumulates paper.

*The qualifying-section,* (see Figs. 1, 12, and 14.)—The qualifying-section 9 is incased like the other sections, and its mechanism is precisely like that of the dollar-section, except that it requires no counter and its indicator and shutter are marked differently.

Referring to Fig. 14, 140 indicates the marking on the qualifying-indicator, the same comprising in the illustration the last nine letters of the alphabet, the first or what might be called the "zero" position of this indicator being left blank, though it may be provided with a symbol, if desired, and 141 indicates a corresponding marking of the qualifying-shutter.

The operation will be obvious in view of the description which has been given of the dollar-section. Its use will now be described. Most transactions on cash-registers in ordinary commercial use represent cash received on account of cash sales. In the absence of any qualification such may be assumed as the nature of the transaction, and such transaction need call for no setting of the qualifying-section, which may be allowed to remain at its blank of indication, or, if desired, the initial point of its indicator may bear the symbol "Q," "Q" in such case standing for the normal and usual transaction. Assume the symbolism to be appropriated as follows—viz., blank (or "Q" if there is one) to mean "cash sale," "R" to mean "cash received on account per memorandum in drawer," "S" to mean "opened drawer to make change," "T" to mean "cash paid out per ticket in drawer," "U" to mean "audited the machine," "V" to mean "testing the machine," "W" to mean "error; cancel last entry and substitute the next one," "X" to mean "deposited in drawer for change purposes," and "Y" and "Z" to mean whatever may be thought desirable. The above system of symbolism both as to symbols selected and as to meaning is simply suggestive. If a clerk pays out money, he sets up the register accordingly, employing the symbol "T" of the qualifying-section, puts a ticket in the drawer to show what it was paid out for, or puts the voucher in the drawer, and similarly with other transactions provided for by the qualifying-section. The printed record will show the entire setting of the register. If the machine is being operated merely to test its movement, then the symbol "V" may be used. If a clerk has set up the register wrongly and worked it, he may before making a new and correct setting work the register on the symbol "W" and his own initial-key, thus getting credit on the record for the erroneous entry previously made. This qualifying system may be carried to any extent desired, and if one qualifying-section will not provide symbols enough other qualifying-sections may be added to the machine. As the qualification of the transaction is mainly for the information of the proprietor, the symbolic system will be found generally satisfactory; but of course the qualifying-indicator instead of bearing symbols may, if desired, bear suitable legends in full, as "Sold," "Received," "Apc.," "Change," "Paid out," "Audit," "Test," "Error," "Deposit," &c. By throwing out the bolt of lock-up lock 59 everything about the machine is locked against use, the bolt of this lock being thrown back when the machine is to be put into use.

All of the parts of the machine when in use are normally locked, with the exception of the clerk's finger-key, it not being possible to turn the operating-shaft or to manipulate the keys of any of the other sections before the clerk's finger-key has been manipulated.

Prior to this manipulation of the clerk's finger-key all of the other parts of the machine remain locked in the condition left by their last setting. The first rising movement of the clerk's finger-key releases all of the segments which may happen to be up and permits them to go to zero, but does not permit them to be moved from zero or unlock the finger-keys of the other sections. Further movement of the clerk's finger-key will release the sectors and finger-keys of the other sections, but only providing the bolt of a clerk's lock is in outward active position. If the bolts are all in retracted or inactive position, then the entire machine, with the exception of the clerk's finger-key, becomes locked with all indicators at zero. Any clerk may with his individual lock-key put his individual lock-bolt into or out of operating condition. The proprietor by putting his lock into action may work the machine on clerk's symbol "1" and may unlock all drawer-compartments, the printed record showing the fact.

The indicators are to be considered as indicators in fact, while the inconspicuous markings on the shutters are simply for the guidance of the operator in setting the keys, the shutters having the effect of obscuring the indicators and producing the aspect of blank indications. The showing at the indicators must necessarily be in correspondence with the last printed record produced by the machine, for the turn of the operating-shaft necessarily produces a printed record in correspondence with the setting of the machine and no indications can show until after the operating-shaft has been turned, the indicators, except those at zero, being obscured by the shutters except after the shaft has completed its turn. Assume for a moment that the shutters are absent and assume the clerk to have made a four-dollar sale. He turns his back to the customer and manipulates the machine, setting it at "five cents," perhaps, or possibly at "Change," and turns the shaft and rings the bell and opens the drawer, everything apparently being done in due form, the record and counter having charged up but five cents at the most. In doing this the clerk must use his own clerk's symbol or some other available clerk's symbol. Having thus made the false entry, which would of course be indicated on the machine as he still faces it, he next resets the machine at four dollars and against his own symbol, but does not turn the shaft. He then turns to the customer and to all appearances the register has been correctly worked, as its indicator shows four dollars; but this transaction has not been worked into the record against this clerk, and the entire setting of the machine will be undone, of course, as a preliminary to the next use of the machine. The counter has of course had the four-dollar charge against it; but it will not show on the record against the clerk or show on the record at all; but with the shutter system such fraudulent manipulation is impossible, for the clerk makes his setting not by means of the indicators, but by means of the inconspicuous shutters, and as a preliminary to the exposure of the indicators he must give the operating-shaft its full turn, the result being that the exposed indicators show positively the condition of the machine at its last actuation and are bound to correspond with the printed record. A given clerk may, as before explained, operate the register as many times as he pleases with the drawer either open or shut; but a change of clerks' symbols requires a closing of the drawer at each change.

Many and perhaps most of the results flowing from the organizations described have been heretofore attained in cash-registers, but by comparatively complicated mechanism, while some of the results attained by the present system are quite novel and highly important.

It is to be understood, of course, that the particular construction set forth is of a merely exemplifying character, the invention lending itself to embodiment in various structural modifications.

By the term "regular operation of the machine" or like expressions employed in the claims is intended to be expressed such an operation of the machine as is necessary between successive opening movements of the drawer. By the term "accounting devices" as used in the claims it is intended to include not only printing devices which are adopted as one form of embodiment of my invention, but also to include registering devices which are well known in the art as affording a means for securing a permanent record or accounting of the various transactions for which the machine is used.

I claim as my invention—

1. The combination, substantially as set forth, of a base, a drawer within the base, drawer-locking mechanism within the base, a casing secured upon said base, mechanism disposed within said casing and connected with said drawer-locking mechanism, an operating-shaft disposed through said casing and connected with the mechanism therein and extending to a distance outside said casing, a second casing secured upon the base at a distance from the first-mentioned casing and engaging said operating-shaft, printing mechanism within said second casing connected with said shaft, register-casings removably secured to said base in the space between said first and second casings, setting and registering mechanism disposed within said register-casings and connected with said operating-shaft, and finger-pieces at each of said register-sections and connected with mechanism therein.

2. The combination, substantially as set forth, of a base, a series of casings mounted thereon, a drawer and locking mechanism therefor within said base, mechanism within the casings, finger-pieces exterior to the casings for setting their mechanism, a shaft engaging all of said casings, and having connection with said drawer-locking mechanism, and locking mechanism within one of said casings serving to lock said shaft against operation on the mechanism of any of said casings.

3. The combination, substantially as set forth, of a base, a series of casings secured thereto, a drawer and locking mechanism therefor within said base, mechanism within the casings, finger-pieces exterior to the casings for setting their mechanisms, locking devices within the casings to lock said finger-pieces, a locking-shaft engaging the locking mechanism of all the casings and having connection with said drawer-locking mechanism, a special casing secured to said base and containing mechanism engaged by said shaft, and a finger-piece exterior to said special casing and serving to produce unlocking movement for said shaft.

4. The combination, substantially as set forth, of a base, a series of casings secured thereto, mechanism within the casings, finger-pieces exterior to the casings for setting the mechanism thereof, a shaft engaging all of the casings, locking mechanism within the casings and connected with said shaft, an operating-shaft engaging all of the casings and connected with the mechanism thereof, a special casing secured upon the base and engaged by both said shafts, mechanism within said special casing to serve in locking both said shafts, a finger-piece exterior to said special casing, and mechanism connected with said shafts and said last-mentioned finger-piece to cause said finger-piece to unlock said shafts.

5. The combination, substantially as set forth, of a base, a drawer therein, a lock normally holding said drawer within said base, a series of casings secured to said base, mechanism within said casings, finger-keys exterior to said casings to serve in setting their mechanisms, a special casing secured to said base, an operating-shaft engaging all of said casings, mechanism within said special casing for locking said shaft, connections from the lock of the drawer to said shaft to cause the turning of the shaft to unlock the drawer, and a finger-piece exterior to said special casing and serving to unlock the shaft.

6. The combination, substantially as set forth, of a base, a casing secured thereto, an indicator in said casing with markings expressive of values, a second casing mounted on said base, an indicator in said second casing with markings expressive of the individuality of the user of the machine, a third casing secured to said base, an indicator in said third casing with markings expressive of the quality of the transaction to be indicated, indicator-locking mechanism in said first and third casings, mechanism connecting said locking mechanism with the indicator in said second casing whereby a movement of the indicator in the second casing is a prerequisite to the movement of the indicators in the first and third casings, and finger-pieces for setting said indicators.

7. The combination, substantially as set forth, of a pair of parallel guide-pins adapted to support a strip of paper bridging between them, a movable paper-feeding pin disposed parallel with and over the paper supported by said pair of pins, a rotary paper-storing hub, means for moving said third pin in a direction at right angles to the common plane of said pair of pins and for intermittently turning said hub, and impression devices engaging the paper strip independent of said paper-feeding pin.

8. The combination, substantially as set forth, of an axis for the support of a supply-roll of paper, a tension device to yieldingly resist the withdrawal of paper from said roll, a rotary shaft, a hub engaging said shaft by friction and adapted to intermittently turn and receive and store paper drawn from said supply-roll, a pair of parallel guide-pins engaging under said paper on its way from the supply-roll to said hub, a movable paper-feeding pin parallel with said pair of pins and adapted for movement in the space between said pair of pins, mechanism connected with said rotary shaft and movable pin to cause the former to intermittently move the latter, and impression mechanism engaging the paper strip independent of said paper-feeding pin.

9. The combination, substantially as set forth, of an axis for the supply-roll of paper, a tension device to yieldingly resist the withdrawal of paper from said roll, a hub to receive and store paper drawn from said supply-roll, a ratchet-wheel on said hub, a pawl engaging said ratchet-wheel and preventing the unwinding of paper from said hub, a rotary shaft frictionally engaging and intermittently turning said hub, a pair of parallel guide-pins engaging the paper on its way from the supply-roll to said hub, a lever, a paper-feeding pin carried by said lever parallel with said pair of pins and adapted for movement in the space between them, means connected with said shaft for intermittently vibrating said lever, and impression mechanism engaging the paper strip independent of said paper-feeding pin.

10. The combination, substantially as set forth, of an axis for the support of a supply-roll of paper, a tension-spring resisting the unwinding of paper from said roll, a rotary shaft, a hub thereon adapted to receive and store paper drawn from said supply-roll, a spring frictionally connecting said shaft and hub to cause the shaft to yieldingly and intermittently rotate the hub, a ratchet-wheel on the hub, a pawl engaging the ratchet-wheel and preventing the unwinding of paper from the hub, a pair of parallel fixed guide-pins engaging the paper as it passes from the supply-roll to the hub, a lever, a paper-feeding pin carried by said lever parallel with said pair of pins and adapted to engage the paper bridging between said pair of pins, a spring urging said lever in one angular direction, cam mechanism connected with said shaft and serving to intermittently move said lever against the resistance of said spring, and impression mechanism engaging the paper strip independent of said paper-feeding pin.

11. The combination, substantially as set forth, of a casing having a wicket, a notched segment pivoted therein, an indicator connected with said segment and adapted to show an indication at said wicket in correspondence with the selected notch of said segment, a movable tooth adapted to engage the notches of the segment and support the segment in adjusted position, a lug upon said segment, and a finger-piece exterior to the casing and adapted to engage said lug and move the segment in direction of advance and retreat independent of the segment.

12. The combination, substantially as set forth, of a casing having a wicket, a notched segment pivoted therein, an indicator connected with said segment and adapted to show an indication at said wicket in correspondence with the selected notch of said segment, a movable tooth adapted to engage the notches of the segment and support the segment in adjusted position, an oscillating finger-piece with its axis coincident with that of the segment, a sector moving with the finger-piece and having teeth in correspondence with the notches of the segment, a movable tooth adapted to engage the teeth of the sector, parts of the sector and segment, as a segment-lug and sector-arm, being adapted for engagement in such manner that advancing movement of the sector enforces advancing movement of the segment, the sector being capable of retreating movement independent of the segment.

13. The combination, substantially as set forth, of a casing having a wicket, an indicator movable to selected degree and serving to show at said wicket an indication in correspondence with the selected degree of movement of said indicator, a shutter adapted for similar selected degree of movement in front of said indicator and serving to obscure it at the wicket, and mechanism connected with said shutter and serving to advance the shutter and indicator simultaneously through similar selected degrees and to retire the shutter alone.

14. The combination, substantially as set forth, of a casing having a wicket, an indicator moving to selected degree within said casing and bearing indications visible in succession through said wicket, a shutter at said wicket in front of and obscuring said indicator and movable to similar selective degree, and mechanism for simultaneously advancing the indicator and shutter in similar degree and putting the shutter to obscuring position and later retiring the shutter.

15. The combination, substantially as set forth, of a segment having a series of notches, a rocking arm having a tooth adapted to lock into any selected one of said notches, a sector with its axis coinciding with that of the segment, means, as a segment-lug and sector-arm to cause the advancing movement of the sector to advance the segment, a series of teeth on the sector in correspondence with the notches of the segment, an advance-preventing locking-tooth at the initial one of said sector-teeth, and a rocking arm adapted to engage said locking-tooth and prevent the advance of the sector or to engage the other teeth of the sector and prevent its retreat.

16. The combination, substantially as set forth, of a segment having a series of notches, a rocking arm having a tooth adapted to lock into any selected one of said notches, a sector with its axis coinciding with that of the segment, means, as a segment-lug and sector-arm to cause the advancing movement of the sector to advance the segment, a series of teeth on the sector in correspondence with the notches of the segment, an advance-preventing locking-tooth at the initial one of said sector-teeth, a rocking arm adapted to engage said locking-tooth and prevent the advance of the sector or to engage the other teeth of the sector and prevent its retreat, a rock-shaft carrying said last-mentioned arm, a pin-and-slot connection between said shaft and last-mentioned arm for causing the shaft to rock the arm in unlocking direction and permitting the arm to rock in unlocking direction independent of the shaft, and a spring connecting the shaft and last-mentioned arm and tending to rock the arm in its locking direction.

17. The combination, substantially as set forth, of a notched segment, a pivoted finger-piece with its axis coincident with that of the segment, a locking-tooth adapted to engage the segment-notches, a connection, as a lug and arm, between the finger-piece and the segment to cause the segment to be advanced by the finger-piece, a rotary shaft, and means connected with said shaft and finger-piece to cause the rotation of the shaft to enforce the retreat of the finger-piece.

18. The combination, substantially as set forth, of a notched segment, a pivoted finger-piece with its axis coincident with that of the segment, a locking-tooth adapted to engage the segment-notches, a connection, as a lug and arm, between the finger-piece and the segment to cause the segment to be advanced by the finger-piece, a rotary shaft, means connected with said shaft and finger-piece to cause the rotation of the shaft to enforce the retreat of the finger-piece, and connections between said shaft and locking-tooth to cause the tooth to be in locking engagement with the segment while the shaft is turning.

19. The combination, substantially as set forth, of a notched segment, a stop to limit the retreating movement of the segment, a toothed sector with its axis coincident with that of the segment, a stop to limit the retreating movement of the sector, parts, as a segment-lug and sector-arm, to engage and cause the segment to move with the sector, a locking-tooth to engage the notches of the segment, a locking-tooth to engage the teeth of the sector, and connections between said two locking-teeth to cause primary movement of the sector-locking tooth to disengage the segment-locking tooth.

20. The combination, substantially as set forth, of a casing having a wicket, a notched segment therein, an indicator carried by the segment and exposing indications at the wicket, a locking-tooth adapted to engage any selected one of the segment-notches, a lug projecting from the segment, an arm pivoted at the axis of the segment and adapted to engage said lug, a hub to said arm projecting exterior to the casing, and a finger-piece on said hub exterior to the casing.

21. The combination, substantially as set forth, of a movable adjusting-piece, a successive series of key-locks secured thereon and having bolts capable of being set to position of protrusion or retraction, and a movable part disposed in the path of the bolts of said locks and adapted to be moved by said bolts successively when in protruded position.

22. The combination, substantially as set forth, of a movable adjusting-piece, a successive series of key-locks secured to said adjusting-piece, bevel-bolts for said locks arranged to be thrown to position of protrusion or retraction, and a movable hook disposed in the path of said bolts and adapted to be moved by and to make hooking engagement with said bolts successively when in protruded position.

23. The combination, substantially as set forth, of a casing, an adjusting-piece therein, a handle exterior to the casing for setting said adjusting-piece, a key-lock mounted on said adjusting-piece, a bolt for said lock adapted to be thrown to position of protrusion or retraction, and a lock-notch in said casing adapted to be engaged by said lock-bolt when thrown to position of protrusion.

24. The combination, substantially as set forth, of a rocking segment provided with a series of notches, a pivoted locking-tooth adapted to engage the notches of the segment, a rocking trigger-arm connected with said locking-tooth and adapted to hold the locking-tooth in engagement with the segment, a rocking finger-piece having a projection adapted to engage and move said notched segment, and a projection on said finger-piece adapted to move said trigger-arm and release said locking-tooth from the segment.

25. The combination, substantially as set forth, of an operating-shaft, a disk thereon having a locking-notch, a lever normally engaging said notch and restraining the shaft against rotation, a rocking arm connected with said lever, a sector, a finger-piece for angularly adjusting the sector, a series of key-locks mounted on the sector, and bolts in said locks adapted, when protruded, to engage said rocking arm and disengage said lever from said lock-notch.

26. The combination, substantially as set forth, of an operating-shaft, a disk thereon having a locking-notch, a lever normally engaging said notch and restraining the shaft against rotation, a rocking arm connected with said lever, a sector, a finger-piece for angularly adjusting the sector, a series of key-locks mounted on the sector, bolts in said locks adapted, when protruded, to engage said rocking arm and disengage said lever from said lock-notch, a notched segment, a locking-tooth engaging the notches of the segment, a trigger connection between said locking-tooth and rocking arm, and a lug upon said sector adapted to move the rocking arm to untrigger said locking-tooth.

27. In a cash-register the combination with an operating mechanism, of an adjusting element arranged to be moved to a number of different positions, a lock for the operating mechanism, an adjustable means intermediate the movable element and said lock, and arranged to be set to operate the lock or not as desired when the adjustable element is in a particular one of its different positions.

28. The combination, substantially as set forth, of an operating-shaft, a cam thereon, a sector, a finger-piece for adjusting the sector, a rock-shaft, a series of teeth upon the sector, an arm upon the rock-shaft and having a tooth to be moved by and engaged with the teeth of the segment, a stop-notch in said cam, a lever on said rock-shaft and normally engaging said stop-notch and adapted to be moved out of said notch by the action of said sector-teeth, and a surface on said cam adapted to act on said lever and move said tooth out of engagement with the sector-teeth.

29. The combination, substantially as set forth, of an operating-shaft, a cam thereon, a sector, a finger-piece for adjusting the sector, a rock-shaft, a series of teeth upon the sector, an arm upon the rock-shaft and having a tooth to be moved by and engaged with the teeth of the segment, a stop-notch in said cam, a lever on said rock-shaft and normally engaging said stop-notch and adapted to be moved out of said notch by the action of said sector-teeth, a surface on said cam adapted to act on said lever and move said tooth out of engagement with the sector-teeth, and means for adjusting said sector-teeth singly into active position of protrusion or inactive position of retraction.

30. The combination, substantially as set forth, of a notched segment, an operating-shaft, a cam thereon having a circular periphery and a notch, a first rock-shaft, an arm thereon having a tooth to engage the segment-notches, a lever on the rock-shaft and engaging said cam and serving to lock said tooth when engaging the circular part of the cam and to permit of the unlocking of the tooth when engaging at the notch of the cam, a second rock-shaft, a lever on said second rock-shaft and engaging a stop-notch in said cam, a hook-arm on said second rock-shaft, a trigger connecting said hook-arm and said first rock-shaft to maintain the locking of the segment, a sector, a finger-piece for adjusting the sector and segment, a lug upon the sector adapted to engage said hook-arm and disengage said trigger, and a series of teeth upon the sector adapted to move the hook-arm and be engaged and held thereby.

31. The combination, substantially as set forth, of a notched segment, an operating-shaft, a cam thereon having a circular periphery and a notch, a first rock-shaft, an arm thereon having a tooth to engage the segment-notches, a lever on the rock-shaft and engaging said cam and serving to lock said teeth when engaging the circular part of the cam and to permit of the unlocking of the tooth when engaging at the notch of the cam, a second rock-shaft, a lever on said second rock-shaft and engaging a stop-notch in said cam, a hook-arm on said second rock-shaft, a trigger connecting said hook-arm and said first rock-shaft to maintain the locking of the segment, a sector, a finger-piece for adjusting the sector and segment, a lug upon the sector adapted to engage said hook-arm and disengage said trigger, a series of teeth upon the sector adapted to move the hook-arm and be engaged and held thereby, and means for adjusting said last-mentioned teeth singly to active position of protrusion or inactive position of retraction.

32. The combination of a base, retaining devices therein, a drawer arranged to slide in said base and divided into compartments, a sliding lid for each of the compartments, locking devices arranged to normally lock said lids to the drawer, but adapted to engage the retaining devices and be retained thereby and thus be operated to disengage from the drawer.

33. The combination with a base, of a drawer arranged to slide therein and divided into compartments, a lid for each of the drawer-compartments, locking devices arranged to lock said lids to the drawer or to the base, and means for supporting the lids independently of the drawer.

34. The combination, substantially as set forth, of a base, a drawer adapted to slide therein, and divided into compartments, a rearwardly-sliding lid for each of the drawer-compartments, locking devices adapted to lock said lids to the drawer or to the base alternatively, guideways connecting said lids with the drawer, and supporting-guideways connecting said lids with the roof of the base.

35. The combination, substantially as set forth, of a base, a sliding drawer therein, and divided into compartments, a sliding lid for each compartment of the drawer, locking devices adapted to lock said lids to the drawer or to the base alternatively, independent bells within said base for each drawer-compartment, and mechanism connected with said bells and locking devices to cause a bell to ring when its individual locking device unlocks its lid from the drawer and locks it to the base.

36. The combination, substantially as set forth, of a base, a drawer sliding therein, and divided into compartments, a rearwardly-sliding lid for each drawer-compartment, an individual locking-lever carried by each lid and adapted to lock it to the drawer, a projection from each of said locking-levers, a sliding plate, and teeth upon said plate in position to be adjusted so that a single locking-lever will be engaged by a plate-tooth.

37. The combination, substantially as set forth, of a base, a drawer sliding therein, and divided into compartments, a rearwardly-sliding lid for each drawer-compartment, an individual locking-lever carried by each lid and adapted to lock it to the drawer, a projection from each of said locking-levers, a sliding plate, teeth upon said plate in position to be adjusted so that a single locking-lever will be engaged by a plate-tooth, a locking device to lock the drawer within the casing, and a projection operated by said last-mentioned device and serving to lock said plate while said locking device is in position corresponding with unlocked condition of the drawer.

38. The combination, substantially as set forth, of a base, a drawer sliding therein, and divided into compartments, a rearwardly-sliding lid for each drawer-compartment, an individual locking-piece for each lid to lock the lids to the drawer, an adjusting-piece to engage said locking-pieces singly and serve in unlocking a single lid from the drawer and locking said lid to the base, a main locking device to lock the drawer and all the lids within the base, and connections between said main locking device and adjusting-piece to serve in locking the latter when the drawer is unlocked from the base.

39. In a cash-register, the combination with a base, retaining devices in said base, an operating mechanism including a finger-piece, a drawer sliding within said base and divided into compartments, a sliding lid for each compartment of the drawer, an individual locking device for locking each lid to the drawer and arranged to engage and be retained by the retaining devices, and means requiring an operation of the finger-piece for bringing the retaining devices into coöperation with the locking devices.

40. The combination, substantially as set forth, of a base, a casing thereon, operating mechanism within said casing, a finger-piece connected with said mechanism, a drawer sliding within said base, and divided into compartments, a rearwardly-sliding lid for each compartment of the drawer, individual locking devices for locking the lids to the drawer or to the base alternatively, means requiring an operation of the finger-piece for releasing any desired lid from the drawer and locking it to the base to determine which of the lids shall move out with the drawer and which shall stay within the casing, and means dependent upon the further operation of said mechanism for opening said drawer.

41. The combination, substantially as set forth, of a base, a casing thereon, operating mechanism within said casing, a finger-piece connected with said mechanism, a drawer sliding within said base, and divided into compartments, a rearwardly-sliding lid for each compartment of the drawer, individual locking devices for locking the lids to the drawer or to the base alternatively, means requiring an operation of the finger-piece for releasing any desired lid from the drawer and locking it to the base, and a drawer-releasing mechanism operated independently of the finger-piece.

42. In a cash-register, the combination with an operating mechanism, of an adjusting-lever arranged to be moved to a number of different positions, a lock for the operating mechanism, and means under lock and key interposed between the lever and said lock whereby the lock may be operated when the lever is in any desired one of its different positions.

43. The combination with a base, of a drawer arranged to slide therein and divided into compartments, a sliding lid for each of the drawer-compartments, locking devices adapted to lock said lids to the drawer or to the base, and means for supporting the lids independently of the drawer.

44. The combination, substantially as set forth, of a base, a drawer sliding therein, and divided into compartments, a rearwardly-sliding lid for each compartment of the drawer, locking-latches normally locking the lids to the drawer and adapted to also lock them to the base, indicating mechanism mounted on the base, means for determining which lid shall be unlocked from the drawer and locked to the base, means for operating the indicating mechanism, and means dependent upon the further operation of the mechanism for opening the drawer.

45. The combination, substantially as set forth, of a base, a drawer sliding therein, and divided into compartments, a rearwardly-sliding lid for each compartment of the drawer, locking-latches normally locking the lids to the drawer and adapted to also lock them to the base, operating and registering mechanism mounted on the base, means for predetermining which lid shall be released from the drawer and locked to the base, means for operating the registering mechanism, and means dependent upon the further operation of the machine for opening the drawer.

46. The combination, substantially as set forth, of a base, a drawer sliding therein, and divided into compartments, a rearwardly-sliding lid for each compartment of the drawer, locking-latches normally locking the lids to the drawer and adapted to also lock them to the base, a printing and recording mechanism, means for predetermining which lid shall be released from the drawer and locked to the base, means for operating the printing and recording mechanism, and means dependent upon the further operation of the machine for opening the drawer.

47. The combination, substantially as set forth, of a base, a drawer sliding therein, and divided into compartments, a rearwardly-sliding lid for each compartment of the drawer, locking-latches normally locking the lids to the drawer and adapted to also lock them to the base, indicating, registering and printing or recording mechanism, means for predetermining which lid shall be released from the drawer and locked to the base, means for operating the indicating, registering and printing or recording mechanism, and means dependent upon the further operation of the machine for opening the drawer.

48. The combination, substantially as set forth, of a base, a drawer sliding therein, and divided into compartments, a rearwardly-sliding lid for each compartment of the drawer, locking-latches normally locking the lids to the drawer and adapted to also lock them to the base, an adjustable finger-piece for predetermining which lid shall be released from the drawer and locked to the base, and means dependent upon the further operation of the machine for opening said drawer.

49. The combination, substantially as set forth, of a base, a drawer sliding therein, and divided into compartments, a rearwardly-sliding lid for each compartment of the drawer, locking-latches normally locking the lids to the drawer and adapted to also lock them to the base, an indicating mechanism, a finger-piece for predetermining which lid shall be released from the drawer and locked to the base, means for operating the indicating mechanism, and means dependent upon the further operation of the machine for opening the drawer.

50. The combination, substantially as set forth, of a base, a drawer sliding therein, and divided into compartments, a rearwardly-sliding lid for each compartment of the drawer, locking-latches normally locking the lids to the drawer and adapted to also lock them to the base, a registering mechanism, a finger-piece for predetermining which lid shall be released from the drawer and locked to the base, means for operating the registering mechanism, and means dependent upon the further operation of the machine for opening the drawer.

51. The combination, substantially as set forth, of a base, a drawer sliding therein, and divided into compartments, a rearwardly-sliding lid for each compartment of the drawer, locking-latches normally locking the lids to the drawer and adapted to also lock them to the base, a printing or recording mechanism, a finger-piece for predetermining which lid shall be released from the drawer and locked to the base, means for operating said printing or recording mechanism, and means dependent upon the further operation of the machine for opening said drawer.

52. The combination, substantially as set forth, of a base, a drawer sliding therein, and divided into compartments, a rearwardly-sliding lid for each compartment of the drawer, locking-latches normally locking the lids to the drawer and adapted to also lock them to the base, an indicating, registering and printing or recording mechanism, a finger-piece for predetermining which lid shall be released from the drawer and locked to the base, and means dependent upon the further operation of the machine for operating said indicating, registering and printing or recording mechanism and for opening the drawer.

53. The combination, substantially as set forth, of a base, a drawer sliding therein, and divided into compartments, a rearwardly-sliding lid for each compartment of the drawer, locking-latches normally locking the lids to the drawer and adapted to also lock them to the base, and a common means for releasing any desired lid from the drawer and locking the same through the latches to the base.

54. The combination, substantially as set forth, of a base, a drawer sliding therein, and divided into compartments, a rearwardly-sliding lid for each compartment of the drawer, locking-latches normally locking the lids to the drawer and adapted to also lock them to the base, an adjustable finger-piece, and means common to said lids for releasing any desired lid from the drawer and locking it to the base upon the operation of the finger-piece.

55. The combination, substantially as set forth, of a base, a drawer sliding therein, and divided into compartments, a rearwardly-sliding lid for each compartment of the drawer, locking devices normally locking the lids to the drawer and adapted to also lock them to the base, a finger-piece adjustable to selective positions, means for printing or recording a symbol expressive of the adjusted position of the finger-piece and expressive of a corresponding drawer-lid, and a common means for actuating such printing or recording mechanism and releasing the drawer.

56. The combination, substantially as set forth, of a base, a drawer sliding therein, and divided into compartments, a rearwardly-sliding lid for each compartment of the drawer, latches and connections normally locking the lids to the drawer and adapted to also lock them to the base, a recording mechanism, a common means for actuating the registering mechanism and the lock connections, and means for so setting the locking device connections, that they will release any desired lid from the drawer and lock it to the base.

57. The combination, substantially as set forth, of a base, a drawer sliding therein, and divided into compartments, a rearwardly-sliding lid for each compartment of the drawer, latches normally locking the lids to the drawer and adapted to also lock them to the base, an indicating mechanism, means for releasing the drawer, a common means for releasing the indicating mechanism and actuating such drawer-releasing means, and means for so setting the lid-locking devices that when the drawer is released any desired lid will be retained and locked to the base.

58. The combination, substantially as set forth, of a base, a drawer sliding therein, and divided into compartments, a rearwardly-sliding lid for each compartment of the drawer, latches normally locking the lids to the drawer and adapted to also lock them to the base, a printing or recording mechanism, a common means for actuating the printing or recording mechanism and the lid-releasing means, and means for causing the lid-locking devices to be actuated by contacting with the lid-releasing means to release any lid from the drawer and lock the same to the base.

59. The combination, substantially as set forth, of a base, a drawer sliding therein, and divided into compartments, a rearwardly-sliding lid for each compartment of the drawer, latches and connections normally locking the lids to the drawer and adapted to also lock them to the base, lock-operating devices, registering, indicating and printing mechanisms, common means for actuating the registering, indicating and printing mechanisms and releasing the drawer, and means for so setting the lock-operating devices that when the drawer is released any desired lid will be released from the drawer and locked to the base.

60. The combination, substantially as set forth, of a base, a drawer sliding therein, and divided into compartments, a rearwardly-sliding lid for each compartment of the drawer, locking-latches normally locking the lids to the drawer and adapted to also lock them to the base, a printing or recording mechanism, an adjustable finger-piece, and means depending upon the adjustment of the finger-piece for releasing any desired lid from the drawer and locking the same to the base after the operation of the printing or recording mechanism and preventing the release of any other lid from the drawer until after another operation of the printing or recording mechanism.

61. The combination, substantially as set forth, of a base, a drawer sliding therein, and divided into compartments, a rearwardly-sliding lid for each compartment of the drawer, locking-latches normally locking the lids to the drawer and adapted to also lock them to the base, a registering, indicating and printing mechanism, an adjustable finger-piece, and means depending upon the adjustment of the finger-piece for releasing any desired lid from the drawer and locking it to the base after the operation of the registering, indicating and printing mechanism and preventing the release of another lid from the drawer until after another operation of the registering, indicating and printing mechanism.

62. The combination, substantially as set forth, of a base, a drawer sliding therein, and divided into compartments, a rearwardly-sliding lid for each compartment of the drawer, latches and connections normally locking the lids to the drawer and adapted to also lock them to the base, an adjustable finger-piece, a device for releasing the drawer, means for operating a particular lid-lock and locking it to the base adjustable by the finger-piece, and means for actuating the drawer-releasing device after the finger-piece is adjusted.

63. The combination, substantially as set forth, of a base, a drawer sliding therein, and divided into compartments, a rearwardly-sliding lid for each compartment of the drawer, locking-latches normally locking the lids to the drawer and adapted to also lock them to the base, an adjustable finger-piece adapted to be set to position to release a particular lid from the drawer, a device for releasing the drawer, a driving-shaft, and means for so connecting the drawer-releasing means with the driving-shaft that the drawer will be released near the end of the operation of the machine.

64. The combination, substantially as set forth, of a base, a drawer sliding therein, and divided into compartments, a rearwardly-sliding lid for each compartment of the drawer, locking-latches normally locking the lids to the drawer and adapted to also lock them to the base, an adjustable finger-piece, and means for releasing a particular lid from the drawer and locking the same to the base when the finger-piece is correspondingly adjusted.

65. The combination, substantially as set forth, of a base, a drawer sliding therein, and divided into compartments, a rearwardly-sliding lid for each compartment of the drawer, latches and connections normally locking the lids to the drawer and adapted to also lock them to the base, a main lock holding the drawer within the base, a casing upon the base, operating mechanism in the casing, a connection from said mechanism to the main lock of the drawer, and an independent connection from said mechanism to the locking devices of the lids.

66. A cash-register including a cash-drawer, a series of independent covers for the same, latches for said covers, latch-tripping devices which become operative only upon the regular operation of the machine, means for setting said devices for operation and means independent of the setting means for actuating the machine to cause the tripping devices to become operative.

67. A cash-register including a cash-drawer divided into independent groups of compartments, independent covers for the respective groups, latches pivoted on said covers for holding the same over the cash-drawer and means for tripping any desired latch arranged to engage and hold the latch and thus prevent a cover from moving forward with the drawer when the latter is opened.

68. A cash-register including a movable cash-receptacle divided into independent groups of compartments, independent covers for the respective groups, movable latches mounted on said covers and engaging the receptacle to hold said covers in position thereon and means for disengaging said latches from the receptacle arranged to engage and hold a desired latch when the receptacle is moved and thus prevent the cover moving with the receptacle.

69. A cash-register including a cash-drawer, a plurality of independent covers for the same, independent latches for said covers, each of which is formed with a projecting arm and means for tripping said latches arranged to engage the nose of the tripped latch and thus hold the cover stationary.

70. In a cash-register, the combination with an operating mechanism, of an adjusting-lever arranged to be moved to different positions for different clerks or departments, means for recording the position of the lever during any operation of the machine, a lock for the operating mechanism, and individual lock devices interposed between said lever and the first-mentioned lock.

71. In a cash-register, the combination with an operating mechanism, of an adjusting-lever arranged to be moved to different positions, a lock for the operating mechanism, and a series of individual locks carried by said lever and arranged to coöperate respectively with the first-mentioned lock to prevent the operation of the latter except when the owners of the individual locks so desire.

72. In a cash-register, the combination with an adjustable setting element, a cash-drawer, and an operating mechanism, of means controlled by the cash-drawer for locking the setting element in adjusted position independently of the operating mechanism.

73. In a cash-register, the combination with a base, and a drawer arranged to slide therein and divided into compartments, a sliding lid for each of the compartments mounted in guides formed in the drawer, and means independent of the drawer for supporting the lids on the base.

74. In a cash-register, the combination with a series of controlling-levers representing the different amount-banks and arranged to be adjusted to give the desired amount, of a special controlling-lever representing a clerk or department and arranged to be moved to different adjusted positions, and locks for all of the amount-levers controlled by the special lever.

75. In a cash-register, the combination with a series of adjustable levers representing the several amount-banks, of a special adjustable lever representing the different clerks or departments, locks for all of the amount-levers controlled by the special lever, and a series of individual locks on the special lever for determining the control between the special and amount levers.

76. The combination with a series of adjustable levers, of a series of amount-indicators moving therewith, a special department or clerk indicator, an adjusting-lever for moving the same, and locks for the amount-levers controlled by the special lever.

77. In a cash-register, the combination with a series of amount-levers, of a series of registering elements actuated thereby, a special lever representing different departments or clerks, and locking devices for the amount-levers controlled by the special levers.

78. In a cash-register, the combination with a series of amount-levers, printing devices controlled thereby, a special department or clerk's lever, a printing device controlled by the same, and locks for the amount-levers controlled by the special lever.

79. In a cash-register, the combination with a series of amount-levers, of a special department or clerk's lever, a cash-drawer having a series of independent compartments, devices for controlling the access to said compartments connected to said special lever, and locking devices for the amount-levers controlled by the special lever.

80. In a cash-register, the combination with a registering mechanism, of a special clerk's or department lever arranged to be adjusted to different positions, locks for the registering mechanism, and individual locks interposed between the special lever and the registering-mechanism locks for controlling the latter.

81. In a cash-register, the combination with a special clerk's or department lever arranged to be moved to different selecting positions by hand, a series of independent cash-compartments, and means controlled by said lever for exposing the desired cash-compartment.

82. In a cash-register, the combination with a registering mechanism, a series of amount-levers for the same, a special department or clerk's lever, a series of independent cash-compartments, and means controlled by said special lever for exposing the desired compartment according to the position of the lever.

83. In a cash-register, the combination with a series of setting elements, of a mechanism for completing the operation commenced by said setting elements, a lock for said operating mechanism, a special movable member, and a series of individual locks interposed between said member and the aforesaid lock for controlling the same.

84. In a cash-register, the combination with a series of registering-levers, a series of counting elements operated by said levers, a special lever, locks for the amount-levers, and a series of individual locks interposed between the special lever and the locks for the amount-levers for controlling said latter locks.

85. In a cash-register, the combination with an operating mechanism, of a cash-drawer divided into compartments, a lid covering each compartment, selecting devices for determining which lid will be held back when the drawer is opened, and locking means for said selecting devices controlled by the drawer.

86. In a cash-register, the combination with an indicator movable to expose different characters thereon, of a second minor indicator movable with and in front of the first-mentioned indicator and arranged to be retracted independent of said first-mentioned indicator.

87. In a cash-register, the combination with two indicators, one of which is provided with large characters for indicating to the customer, and the other with small characters for indicating to the operator, and means whereby the indicators are moved together with the minor indicator obscuring the main indicator; the construction being such that the minor indicator may be retracted and leave the main indicator in indicating position.

88. In a cash-register, the combination with a setting element, a cash-drawer, and a latch for said drawer, of means controlled by said drawer-latch for locking said setting element from operation while said cash-drawer is open.

89. In a cash-register, the combination with a series of amount-levers, of a special lever, locks for the amount-levers controlled by the special lever, a cash-drawer, and means for locking the special lever while the cash-drawer is open.

90. In a cash-register, the combination with an indicator controlled by an adjustable hand-lever, of a flash for concealing said indicator, an operating mechanism, including an operating-handle, and means actuated by the operating mechanism for causing the flash to pass from in front of the indicator, and means for returning the flash by the movement of the adjusting-lever.

91. In a cash-register, the combination with an operating mechanism, including a handle or lever, a series of setting-levers, a cash-drawer, and means for locking the machine while the cash-drawer is open.

92. In a cash-register, the combination with a casing, of a series of amount-levers, of a special lever, locks for the amount-levers controlled by the special lever, and a lock for locking the special lever to the casing and thus locking the entire machine.

93. In a cash-register, the combination with a series of levers, of a series of indicators connected thereto for indicating amounts, a special qualifying-lever, an indicator connected thereto for indicating special transactions, such as "charge," "paid out" "received on account," a special clerk's lever, an indicator connected thereto for indicating the respective clerks or departments, and locking devices for the amount-levers controlled by the clerk's lever.

94. In a cash-register the combination with an operating mechanism, of a cash-drawer divided into compartments, a cover for each compartment, and means arranged to be set to retain any one of the covers in the casing when the drawer moves forward, or if so desired, to retain all of the covers within the casing upon such operation of the drawer.

95. In a cash-register the combination with an operating mechanism including a hand-lever, of an adjusting element arranged to be moved to different positions for different transactions, a lock for the operating mechanism, and a series of independent lock devices between said lock and the adjusting element whereby the operating mechanism remains locked or not as desired in any of its different positions.

96. In a cash-register the combination with an operating mechanism, of a setting element arranged to be moved to different positions for different transactions, an accounting device connected to said element, a lock for the operating mechanism, an adjustable means intermediate the movable element and said lock, for operating the lock or not as desired when the movable element is in its different adjusted positions.

97. In a cash-register the combination with an operating mechanism, of a setting element arranged to be moved to different positions for different transactions, a lock for the operating mechanism, and a series of lock-controlled independently-adjustable devices intermediate the first-mentioned lock and the setting element whereby the operating mechanism remains locked or not as desired when the setting element is in any of its different adjusted positions.

98. In a cash-register the combination with an operating mechanism, of a setting element arranged to be moved to different positions for different transactions, a lock for the operating mechanism, and a series of key-locks having detachable keys and arranged intermediate the setting element and first-mentioned locking device whereby the operating mechanism may be locked or not as desired when the setting element is adjusted to any of its different positions.

99. In a cash-register the combination with an operating mechanism, of an adjusting-lever arranged to be moved to different positions, a lock for the operating mechanism, a means under lock and key and arranged to be adjusted in relation to the operating-lever so as to cause a movement of the same to operate the lock for the operating mechanism.

100. In a cash-register the combination with a registering mechanism, of an indicator, a movable member for adjusting said indicator to any desired position, and a series of locks and connections arranged to prevent the operation of the machine when the movable member is adjusted to bring predetermined indications into view.

101. In a cash-register the combination with a registering mechanism, of an adjusting-lever for controlling the same and a series of locks and connections which may be adjusted to prevent the operation of the machine when the adjusting-lever is moved to certain predetermined positions.

102. In a cash-register the combination with an operating mechanism, of an adjusting-lever representing different clerks or departments and arranged to be moved to different positions, and a series of locks and connections which may be adjusted to prevent the operation of the machine when the lever is moved to certain positions representing absent clerks.

103. In a cash-register the combination with a cash-receptacle containing a series of independent tills, movable covers for the respective tills, means for locking the covers over the tills and devices for operating the locks by the opening movement of the cash-receptacle.

104. In a cash-register the combination with a sliding cash-receptacle having independent compartments, of covers for said compartments, locks for securing the covers in position over the compartments and means whereby the opening of the cash-receptacle operates the desired lock.

105. In a cash-register the combination with a cash-receptacle divided into compartments, covers for said compartments, locks for securing the covers in position over the compartments and devices for independently operating the locks by the opening movement of the cash-receptacle.

106. In a cash-register the combination with a cash-receptacle divided into compartments, covers for said compartments, locks for securing the covers in position, means for operating the locks by the opening movement of the cash-receptacle, devices for setting said operating means and a printing mechanism connected to said setting devices whereby a record is made of the compartment that is opened.

107. In a cash-register the combination with an amount-printing mechanism, and a special department-printing device, of a cash-receptacle divided into compartments, covers for said compartments, locks for securing the covers in position, said locks being operated upon the opening movement of said receptacle, means for predetermining which lock will be operated by said opening movement of the cash-receptacle, and devices connected to said means for controlling the department-printing device.

108. In a cash-register the combination with a sliding cash-drawer divided into compartments, independent covers for said compartments, locks for securing the covers in position over the drawer and means for operating the desired lock by the opening movement of the drawer.

109. In a cash-register the combination with an automatically-opening cash-receptacle divided into compartments, independent covers for the respective compartments, locks for securing the covers in position and means for predetermining which lock will be operated by the opening movement of the cash-receptacle.

110. In a cash-register the combination with a cash-drawer, a spring for opening the drawer when released, a latch for the drawer, independent slides for covering the drawer, locks for securing the slides in position upon the drawer and means for operating the desired lock by the opening movement of the drawer.

111. In a cash-register the combination with a cash-receptacle divided into compartments, covers for said compartments, locks for securing the covers in position, means for operating the desired lock by the opening movement of the cash-receptacle and devices for keeping classified accounts of the amounts which should be found in each compartment.

112. In a cash-register the combination with the accounting devices for the amounts of different transactions arranged to classify the same, of a cash-receptacle divided into compartments, covers for the respective compartments, locks for securing the covers in position over the compartments and means for operating the desired lock by the opening movement of the cash-receptacle.

113. In a cash-register the combination with a cash-receptacle divided into compartments, covers for said compartments, locks for securing the covers over the compartments, operating elements arranged to be moved into the paths of said locks to operate the latter by the opening movement of the receptacle and means for setting said element to the desired position.

114. In a cash-register the combination with a cash-receptacle, of a cover for the same, a lock for securing the cover in position, and means for operating the lock by the opening movement of the receptacle.

115. In a cash-register the combination with a registering mechanism, of a series of registering-levers arranged to be moved to different positions, a special setting-lever arranged to be moved to different positions and locking devices for the registering-levers arranged to be operated by the movement of the special lever to release the said registering-levers.

116. In a cash-register the combination with a series of registering-levers, of a special clerk's lever arranged to be moved to different positions, locks for the registering-levers arranged to be operated by the initial movement of the clerk's lever.

117. In a cash-register the combination with a series of registering controlling devices, a clerk's lever arranged to be moved to different positions and a lock for each of the register-controlling devices arranged to be operated by the movement of the clerk's lever.

118. In a cash-register, the combination with a series of setting elements, and accounting devices controlled thereby, of a differentially-adjustable special setting element, and locking mechanism for said setting elements controlled by said adjustable special setting element.

119. In a cash-register the combination with a series of amount-levers arranged to be moved to different positions, a special department-lever also arranged to be moved to different positions, locks for the amount-levers controlled by the special lever, a series of type-carriers for the respective levers and connecting means intermediate the type-carriers and levers.

120. In a cash-register the combination with a cash-drawer divided into compartments, of covers for said compartments, locks for the covers and adjustable means for operating any one of the locks or all of the locks at will by the opening movement of the drawer.

121. In a cash-register, the combination with a setting element, a cash-drawer, and an operating mechanism, of a locking means controlled by the cash-drawer for holding said element in operated position to permit a repeating operation.

122. In a cash-register, the combination with an adjustable setting element, a cash-drawer, and an operating mechanism, of means for holding said setting element in adjusted position, with provisions permitting the return of the same to normal position at each operation of the machine, and means controlled by the drawer for locking said setting element in adjusted position independently of the aforesaid holding means whereby to secure a repeating operation.

JAMES W. SEE.

Witnesses:
E. R. SHIPLEY,
M. S. BELDEN.